United States Patent
Li et al.

(10) Patent No.: US 11,188,965 B2
(45) Date of Patent: Nov. 30, 2021

(54) METHOD AND APPARATUS FOR RECOMMENDING CUSTOMER ITEM BASED ON VISUAL INFORMATION

(71) Applicant: Samsung Electronics Co., Ltd., Suwon-si (KR)

(72) Inventors: Weiming Li, Beijing (CN); Dongdong Yu, Beijing (CN); Yang Liu, Beijing (CN); Qiang Wang, Beijing (CN); Minsu Ahn, Yongin-si (KR); Sunghoon Hong, Suwon-si (KR); Yueying Kao, Beijing (CN); Zairan Wang, Beijing (CN); Hao Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 179 days.

(21) Appl. No.: 16/161,153

(22) Filed: Oct. 16, 2018

(65) Prior Publication Data

US 2019/0205965 A1    Jul. 4, 2019

(30) Foreign Application Priority Data

Dec. 29, 2017  (CN) .......................... 201711483236.5
Jul. 11, 2018  (KR) ........................ 10-2018-0080566

(51) Int. Cl.
*G06Q 30/06* (2012.01)
*G06F 16/583* (2019.01)
*G06T 7/11* (2017.01)

(52) U.S. Cl.
CPC ....... *G06Q 30/0631* (2013.01); *G06F 16/583* (2019.01); *G06Q 30/0643* (2013.01); *G06T 7/11* (2017.01)

(58) Field of Classification Search
CPC ..... G06Q 30/0201–0206; G06Q 30/06; G06Q 30/0601–0643; G06Q 30/0251–0277;
(Continued)

(56) References Cited

U.S. PATENT DOCUMENTS

| 7,113,917 B2 | 9/2006 | Jacobi et al. |
| 8,762,226 B2 | 6/2014 | Kalin et al. |

(Continued)

FOREIGN PATENT DOCUMENTS

| KR | 10-1017016 B1 | 2/2011 |
| KR | 10-1147050 B1 | 5/2012 |

(Continued)

OTHER PUBLICATIONS

Visually-Aware Fashion Recommendation and Design with Generative Image Models. Wang-Cheng Kang, et al. 2017 IEEE International Conference on Data Mining. Date of Conference: Nov. 18-21, 2017. Date Added to IEEEXplore: Dec. 18, 2017 (Year: 2017).*

(Continued)

*Primary Examiner* — William J Allen
(74) *Attorney, Agent, or Firm* — NSIP Law

(57) ABSTRACT

An apparatus for recommending a customer item identifies a purchase tendency of a customer based on an image, determines a recommended item for the customer by selecting a purchase tendency model corresponding to the purchase tendency, and provides information associated with the determined recommended item.

18 Claims, 16 Drawing Sheets

(58) Field of Classification Search
CPC ............ G06Q 30/0631; G06Q 30/0643; G06F 16/50–51; G06F 16/53; G06F 16/58–5862; G06F 16/583; G06F 16/9535; G06F 17/10–11; G06F 17/16; G06N 20/00; G06T 7/10; G06T 7/11; G06T 7/12

See application file for complete search history.

(56) References Cited

U.S. PATENT DOCUMENTS

| | | | | |
|---|---|---|---|---|
| 9,043,230 | B2 | 5/2015 | Adoni et al. | |
| 9,420,319 | B1* | 8/2016 | Story, Jr. | G06Q 30/0631 |
| 2014/0363059 | A1* | 12/2014 | Hurewitz | G06Q 30/0201 |
| | | | | 382/118 |
| 2015/0026010 | A1* | 1/2015 | Ellison | G06Q 30/0631 |
| | | | | 705/26.41 |
| 2015/0088911 | A1 | 3/2015 | Qiao et al. | |
| 2015/0127483 | A1 | 5/2015 | Elliot et al. | |
| 2015/0206222 | A1* | 7/2015 | Bart | G06Q 30/0631 |
| | | | | 705/26.7 |
| 2015/0302505 | A1* | 10/2015 | Di | G06Q 30/0631 |
| | | | | 705/26.7 |
| 2015/0310529 | A1 | 10/2015 | Ronen et al. | |
| 2017/0039775 | A1* | 2/2017 | Applegate | G06T 7/30 |
| 2017/0098314 | A1 | 4/2017 | Sayre, III et al. | |
| 2017/0300999 | A1* | 10/2017 | Wilkinson | G06F 16/288 |
| 2017/0352091 | A1* | 12/2017 | Chen | G06F 3/0482 |
| 2018/0047036 | A1* | 2/2018 | Zhang | G06N 5/022 |
| 2018/0122096 | A1* | 5/2018 | Yang | G06T 7/50 |
| 2018/0146253 | A1* | 5/2018 | Louboutin | G06Q 30/0201 |
| 2019/0147228 | A1* | 5/2019 | Chaudhuri | G06Q 30/0201 |
| | | | | 382/118 |

FOREIGN PATENT DOCUMENTS

| | | |
|---|---|---|
| KR | 10-2012-0076671 A | 7/2012 |
| KR | 10-1407207 B1 | 6/2014 |
| KR | 10-2015-0000418 A | 1/2015 |
| KR | 10-1622940 B1 | 5/2016 |
| KR | 10-1768521 B1 | 8/2017 |

OTHER PUBLICATIONS

Rendle, Steffen, et al., "BPR: Bayesian Personalized Ranking from Implicit Feedback", *Proceedings of the Twenty-Fifth Conference on Uncertainty in Artificial Intelligence*, AUAI Press, Jun. 18, 2009 (pp. 452-461).

Koren, Yehuda et al., "Matrix Factorization Techniques for Recommender Systems", *Computers*, Aug. 8, 2009 (pp. 42-49).

McAuley, Julian, et al. "Image-based Recommendations on Styles and Substitutes", *Proceedings of the 38th International ACM SIGIR Conference on Research and Development in Information Retrieval*, ACM, Jun. 17, 2015 (pp. 1-11).

He, Ruining, et al., "VBPR: Visual Bayesian Personalized Ranking from Implicit Feedback", *Proceedings of the Thirtieth AAAI Conference on Artificial Intelligence*, Feb. 12, 2016 (pp. 144-150).

He, Ruining, et al. "Sherlock: Sparse Hierarchical Embeddings for Visually-aware One-class Collaborative Filtering", *Cornell University Library*, arXivpreprint arXiv:1604.05813, Apr. 20, 2016 (7 pages in English).

Zhao, Hengshuang, et al. "Pyramid Scene Parsing Network", *2017 IEEE Conference on Computer Vision and Pattern Recognition (CVPR)*, Jul. 1, 2017 (pp. 2881-2890).

* cited by examiner

METHOD AND APPARATUS FOR RECOMMENDING CUSTOMER ITEM BASED ON VISUAL INFORMATION

CROSS-REFERENCE TO RELATED APPLICATIONS

This application claims the benefit under 35 USC § 119(a) of Chinese Patent Application No. 201711483236.5, filed on Dec. 29, 2017, in the Chinese Patent Office, and Korean Patent Application No. 10-2018-0080566, filed on Jul. 11, 2018, in the Korean Intellectual Property Office, the entire disclosures of which are incorporated herein by reference for all purposes.

BACKGROUND

1. Field

The following description relates pattern recognition and computer vision, and to technology that recommends personalized product and service.

2. Description of Related Art

Existing product recommendation technology mostly recommends products based on data related to purchase records of customers, for example, purchase records and product viewing records.

For example, the product recommendation technology may recommend products similar to previously purchased or viewed products based on online purchase records or online viewing records of a customer. However, the product recommendation technology is applicable only to online purchase actions of the customer and is not applicable to purchase actions of the customer in a physical or offline store.

When a customer is doing shopping in a physical store, a clerk may provide a recommendation to the customer based on purchase records of the customer. However, for a customer who visits the physical store for the first time, past purchase or viewing records lack. Thus, it is difficult for the clerk to provide an appropriate recommendation to the customer.

Augmented reality (AR) technology may be used to overlap related information one over another for a user in reality. The AR technology may improve a quality of user experience. In the field of existing applications, the AR technology may be applied principally to three fields of display, content generation, and user interaction.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of recommending a customer item, the method including acquiring an image corresponding to a customer, determining a recommended item for the customer based on the acquired image, and providing information associated with the recommended item.

The determining may include identifying a purchase tendency of the customer based on the acquired image, and determining the recommended item for the customer based on the purchase tendency.

The acquiring of the image may include acquiring at least one customer image using a camera, and wherein a field of view (FOV) of the camera may cover at least a portion of an area in a physical store.

The acquiring of the image may include acquiring the image with respect the customer from among customers shown in a user terminal.

The determining may include extracting an image feature of the customer from the image, and determining the recommended item for the customer based on the image feature.

The determining of the recommended item based on the image feature may include retrieving a purchase tendency model corresponding to the customer from a purchase tendency model database based on the image feature, and determining the recommended item for the customer based on the purchase tendency model corresponding to the customer.

The method of claim 6, wherein the purchase tendency model database may include purchase tendency models, wherein each of the purchase tendency models may include a feature vector of an item corresponding to a fashion category, a feature vector of the customer image, and a feature vector of an item corresponding to a non-fashion category, and wherein the retrieving may include calculating a correlation level between the customer and each of the purchase tendency models based on the feature vector of the item corresponding to the fashion category, the feature vector of the customer image, the feature vector of the item corresponding to the non-fashion category, and the image feature of the customer, and selecting a purchase tendency model having a highest correlation level from among the purchase tendency models to be the purchase tendency model of the customer.

The method may include building the purchase tendency model database by building a purchase tendency model using an online purchase database.

The building may include training the purchase tendency model with statistics of online purchase records of the customer, determining an identifier of the customer from decomposing a purchase history matrix indicating an item purchase history of the customer, classifying customers into a plurality of customer clusters based on the identifier of the customer, and determining an identifier of a corresponding category based on per-category purchase data regarding each of the plurality of customer clusters.

The method may include building the purchase tendency model database by building an offline purchase tendency model using a physical store purchase database.

The building may include extracting a customer identification (ID), the image, and purchase records of the customer from the physical store purchase database, obtaining appearance information of the customer and purchase action information of the customer by analyzing the image, classifying customers into a plurality of customer clusters based on the information obtained from the customer image, and calculating a feature vector of a corresponding category based on per-category purchase data regarding each of the plurality of customer clusters.

The determining of the recommended item based on the purchase tendency model corresponding to the customer may include matching an item image of a corresponding item and the image, with an item corresponding to each category in the purchase tendency model, and determining the recommended item based on a fitting score calculated between the item image and the customer image.

The fitting score is based on calculating an inner product between a feature vector of an individual item in the purchase tendency model and a feature vector of an item worn by the customer.

The providing may include transmitting a push request to a customer terminal including an augmented reality (AR) display, and receiving information indicating whether the push request is accepted from the customer terminal.

The providing may include transmitting the information associated with the recommended item to a customer terminal in response to the push request being accepted by the customer terminal.

The providing may include transmitting item information related to the recommended item to a display disposed within a threshold distance from a position of the customer.

The providing may include transmitting the information associated with the recommended item to any one or any combination of a work terminal and a customer terminal.

The determining may include determining the recommended item based on a purchase area in which the customer is positioned and the customer image.

In another general aspect, there is provided an apparatus for recommending a customer item, the apparatus including an image acquirer configured to acquire an image, and a processor configured to determine a recommended item for the customer based on the image and to provide information associated with the determined recommended item.

Other features and aspects will be apparent from the following detailed description, the drawings, and the claims.

Figure 1:
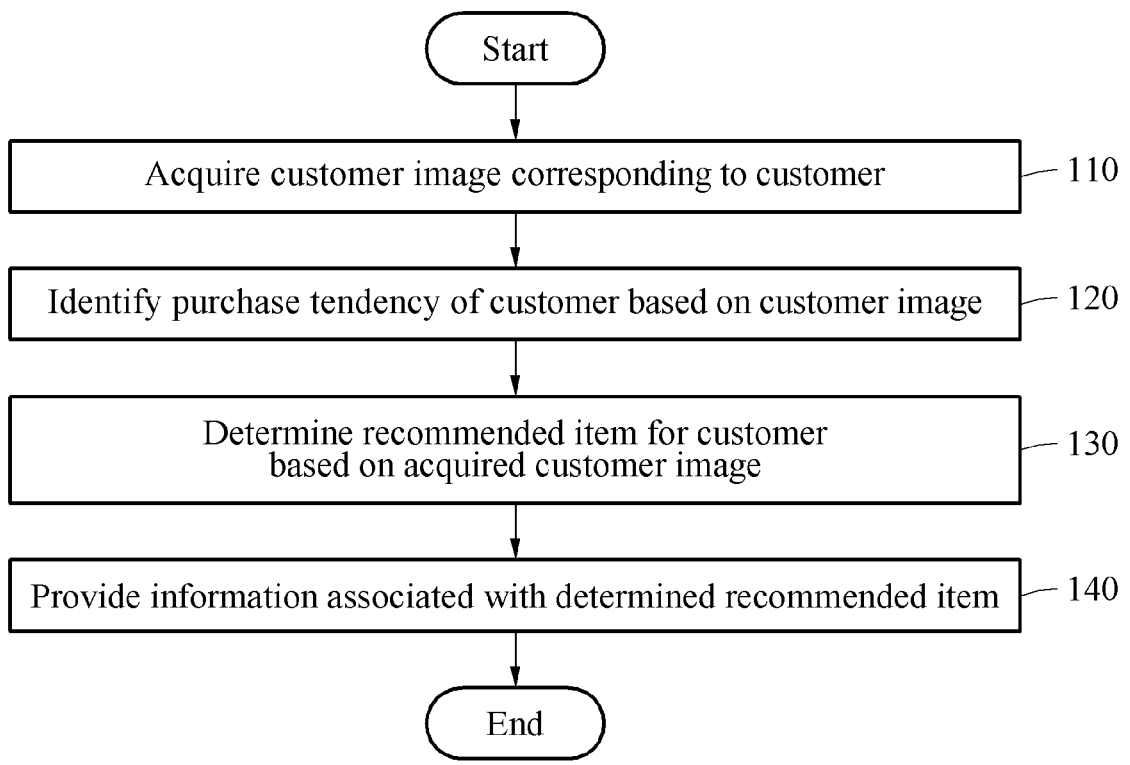
FIG. 1 illustrates an example of a customer item recommending method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. As used herein, the singular forms are intended to include the plural forms as well, unless the context clearly indicates otherwise. As used herein, the term "and/or" includes any one and any combination of any two or more of the associated listed items. As used herein, the singular forms "a", "an", and "the" are intended to include the plural forms as well, unless the context clearly indicates otherwise.

When describing the examples with reference to the accompanying drawings, like reference numerals refer to like constituent elements and a repeated description related thereto will be omitted. When it is determined detailed description related to a related known function or configuration may make the purpose of the examples unnecessarily redundant in describing the examples, the detailed description will be omitted here.

All documents cited in the present disclosure, including published documents, patent applications, and patents, may be incorporated herein in their entirety by reference in the same manner as when each cited document is separately and specifically incorporated or incorporated in its entirety.

FIG. 1 illustrates an example of a customer item recommending method. The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by special purpose hardware-based computer that perform the specified functions, or combinations of special purpose hardware and computer instructions.

A customer item recommending apparatus selects information that a customer is interested in from a large volume of product related data for augmented reality (AR) shopping. The customer item recommending apparatus identifies a purchase tendency of the customer to select the information that interests the customer.

In operation 110, the customer item recommending apparatus acquires a customer image corresponding to the customer. For example, the customer item recommending apparatus acquires or receives at least one customer image. In an example, an agent of a physical or offline store inputs the customer image into the customer item recommending apparatus through a user interface (UI).

In operation 120, the customer item recommending apparatus identifies a purchase tendency of the customer based on the customer image. For example, the customer item recommending apparatus retrieves a purchase tendency model corresponding to the customer based on a feature vector of a partial image for each individual item obtained by segmenting the customer image.

In operation 130, the customer item recommending apparatus determines a recommended item for the customer based on the acquired customer image. For example, the customer item recommending apparatus determines the recommended item based on the identified purchase tendency of the customer. The customer item recommending apparatus determines the recommended item for the customer based on the purchase tendency model corresponding to the customer. The recommended item includes, for example, a recommended product and a recommended service.

In operation 140, the customer item recommending apparatus provides information associated with the recommended item. The information associated with the recommended item includes, for example, a category, a class, and a visual form of the recommended item. For example, the customer item recommending apparatus forwards or visualizes information associated with the recommended product or information associated with the recommended service to the customer.

Figure 2:
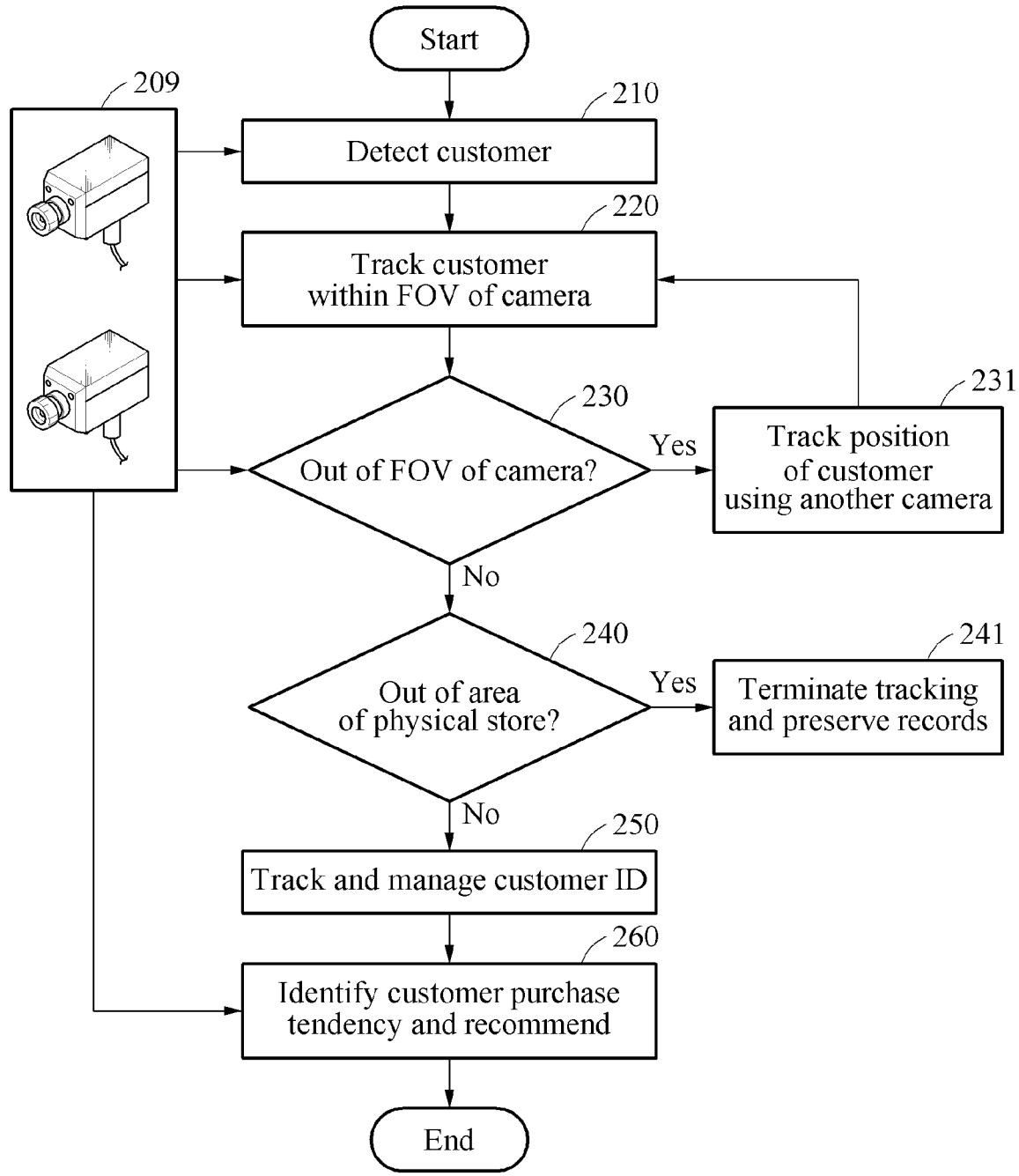
FIG. 2 illustrates an example of managing a customer based on image acquisition.

FIG. 2 illustrates an example of managing a customer based on image acquisition.

A customer item recommending apparatus includes a plurality of cameras 209. The customer item recommending apparatus acquires customer images using the plurality of cameras 209. The plurality of cameras 209 is positioned in a region corresponding to a physical store, and a field of view (FOV) of the plurality of cameras 209 covers at least a portion of the physical store. The plurality of cameras 209 may also cover the entire area in the physical store. The plurality of cameras 209 is mounted on devices such as, a surveillance camera, a robot, a head-mounted display (HMD) device, and a wearable glass.

In operation 210, the customer item recommending apparatus detects a customer. In an example, the customer item recommending apparatus detects a customer positioned in a purchase area of the physical store.

In operation 220, the customer item recommending apparatus tracks the customer within an FOV of a camera. In an example, the customer item recommending apparatus tracks the customer using a single camera. However, examples are not limited thereto. The customer item recommending apparatus may track the customer using a plurality of cameras.

In operation 230, the customer item recommending apparatus determines whether the customer being tracked is out of the FOV of the camera. When the customer is out of a FOV of a camera, the customer item recommending apparatus tracks a position of the customer using another camera providing an FOV proximate to the FOV of the corresponding camera, in operation 231. Further, when customer identification using a camera is not available due to any one or any combination of an FOV, a resolution, a distance, and a lighting condition, the customer item recommending apparatus tracks the customer through another camera.

In operation 240, the customer item recommending apparatus determines whether the customer is out of the physical store. The customer item recommending apparatus estimates a position of the customer from tracking information obtained using the camera and determines whether the estimated position of the customer is outside of the area of the physical store. In operation 241, when it is determined that the customer is already out of the purchase area of the physical store, the customer item recommending apparatus terminates tracking the customer and preserves customer records information. For example, in a case in which the customer is out of the area of the physical store, the customer item recommending apparatus stores the customer records information corresponding to a customer identification (ID) of the customer. The customer ID will be described below.

In operation 250, the customer item recommending apparatus tracks the corresponding customer and manages the customer ID while the customer is within the physical store.

In operation 260, the customer item recommending apparatus identifies a customer purchase tendency and recommends an item. For example, when it is detected that the customer is positioned in the purchase area of the physical store, the customer item recommending apparatus identifies the detected customer. The customer item recommending apparatus retrieves a customer ID matching a customer image of the detected customer. When matching result is not found, the customer item recommending apparatus generates a customer ID with respect to the customer. The customer ID refers to an identifier to identify a customer, and the same customer ID is assigned to customer images indicating the same identification. An identification indicated by the customer image is identified, for example, through face recognition.

The customer item recommending apparatus outputs the customer image and the customer ID to identify a purchase tendency of the customer while detecting and tracking the customer. The customer item recommending apparatus recommends an item for the customer corresponding to the customer ID.

Further, the customer item recommending apparatus receives a plurality of customer images while detecting and tracking the customer based on information required for each purchase tendency identification scheme. For example, the customer item recommending apparatus receives a plurality of customer images acquired at different times while tracking the customer.

The customer records information preserved when the customer goes out of the purchase area of the physical store includes the customer ID and image data indicating the customer, for example, the customer image, and may further include actual purchase records of the customer. The purchase records of the customer include, for example, a product, a type, a brand, a size, a quantity, and a price of a product purchased by the customer. However, the purchase records are not limited thereto and may vary depending on a design.

Figure 3:
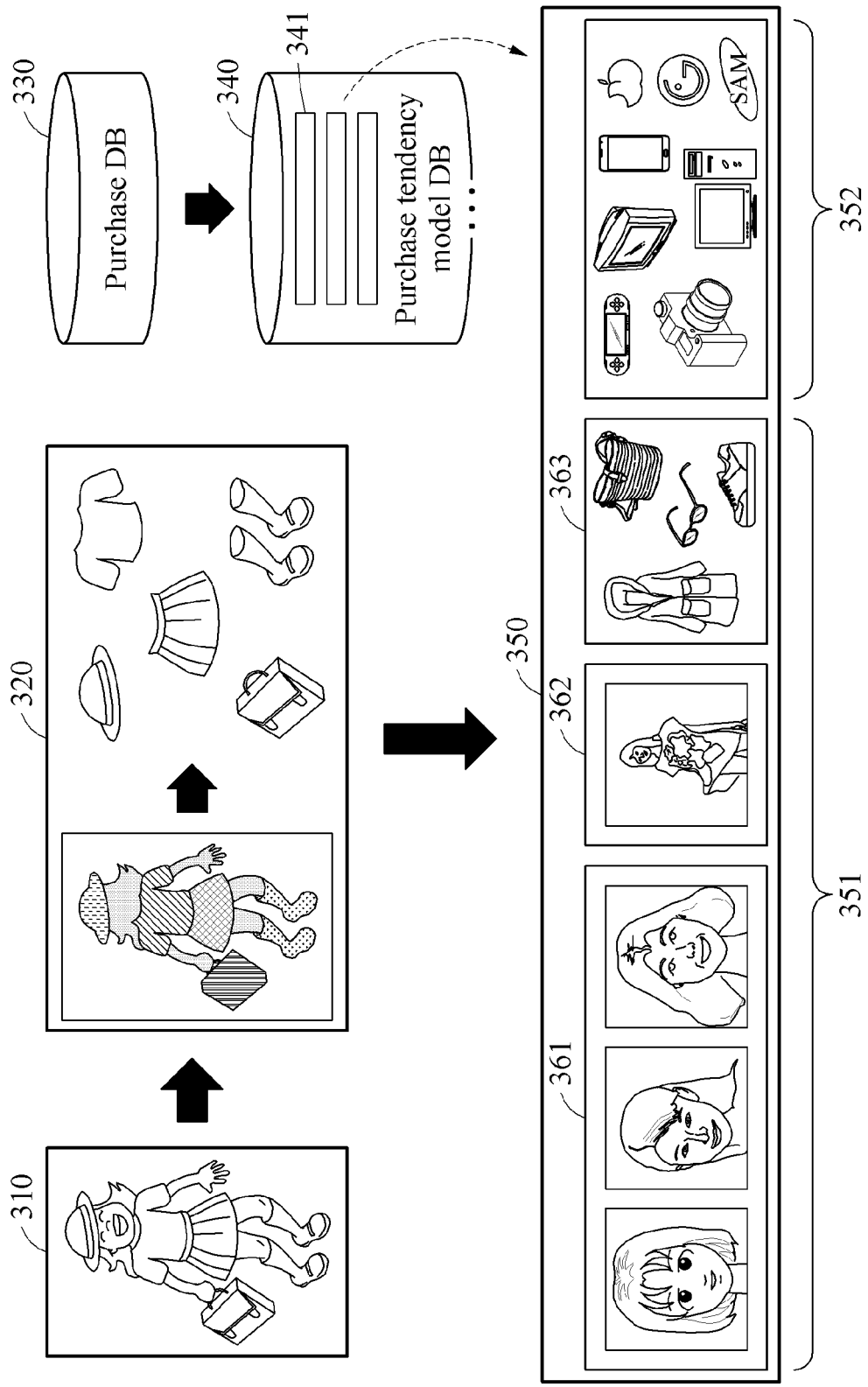
FIG. 3 illustrates an example of identifying a purchase tendency of a customer based on a customer image.

FIG. 3 illustrates an example of identifying a purchase tendency of a customer based on a customer image.

In an example, identifying a purchase tendency of a customer includes two procedures, an offline procedure and an online procedure. The offline procedure includes a process of building a purchase tendency model database 340 from a purchase database 330. The online procedure includes a process of retrieving a purchase tendency model 350 suitable for a customer. For example, the online procedure includes an operation of acquiring a customer image 310 and an operation of automatically determining the purchase tendency model 350 most suitable for the corresponding customer from the purchase tendency model database 340 based on a visual feature of a customer appearance identified from the customer image 310.

The purchase tendency model database 340 includes a plurality of purchase tendency models 341. Each of the plurality of purchase tendency models 341 is generated from the purchase database 330. The purchase database 330 is a database built based on a purchase action of an individual customer occurring in a physical store or online store. For example, the customer item recommending apparatus obtains the plurality of purchase tendency models 341 through a statistical analysis with respect to the purchase database 330. In addition, the customer item recommending apparatus generates a purchase history matrix by statistically analyzing purchase histories of customers having similar purchase tendencies. The customer item recommending apparatus obtains a purchase tendency feature vector indicating a tendency of purchasing items corresponding to different classes by decomposing the purchase history matrix using collaborative filtering. Each purchase tendency model 350 includes the purchase tendency feature vector indicating the tendency of purchasing items.

In an example, each of the plurality of purchase tendency models 341 indicates a representative, single-type, average purchase tendency of customers. For example, the purchase tendency model 350 is a model indicating a purchase tendency representing a customer cluster into which a number of customers are clustered. The purchase tendency model 350 includes various feature vectors indicating the purchase tendency of the corresponding customer cluster. For example, the purchase tendency model 350 includes customer image feature vectors, feature vectors 351 corresponding to a fashion category, and feature vectors 352 corresponding to a non-fashion category. FIG. 3 illustrates, for ease of description, an image or action from which the feature vectors of the purchase tendency model 350 are to be extracted. However, a feature vector of an actual purchase tendency model 350 may be implemented as a vector indicating a value abstracting the corresponding image or action.

In an example, items belonging to the fashion category include items that a person may wear. Items belonging to the non-fashion category include remaining items not belonging to the fashion category. Further, the fashion category and the non-fashion category are each classified into a plurality of classes. For example, the fashion category includes a tops class, a bottoms class, and an accessories class. The non-fashion category includes a brand class, and an electronics class. However, classes belonging to each category are not limited thereto, and the fashion category and the non-fashion category may vary depending on a design and the class of each of the fashion category and the non-fashion category may vary depending on a design.

When a customer image 310 of a target customer is acquired, the customer item recommending apparatus extracts features of the customer, for example, a feature vector of a product corresponding to the fashion category and a customer image feature vector, from the customer image 310. Further, the customer item recommending apparatus generates a partial image 320 by segmenting the customer image 310 and extracts an additional feature from the partial image 320.

For example, the customer item recommending apparatus retrieves the purchase tendency model 350 most suitable for the target customer from the purchase tendency model database 340 based on the above features. For example, the customer item recommending apparatus retrieves, from the purchase tendency model database 340, the purchase tendency model 350 having feature vectors similar to a customer image feature vector extracted from the customer image 310 of the corresponding customer, a feature vector with respect to the partial image 320, and a feature vector with respect to the non-fashion category. The customer item recommending apparatus determines the retrieved purchase tendency model 350 to be the purchase tendency model 350 with respect to the target customer.

The customer item recommending apparatus obtains personal information such as an age, a gender and an ethnic group of the customer by analyzing feature vectors 361 with respect to the customer image 310. For example, the customer item recommending apparatus extracts the feature vectors 361 from the customer image 310 based on an image recognition model and identifies the age, the gender, and the ethnic group of the customer corresponding to the extracted feature vectors 361. The customer item recommending apparatus extracts the feature vectors 361 from a face image in the customer image 310 based on the image recognition model. The image recognition model includes a machine learning structure designed to output personal information (for example, an age and a gender) of a person from an image of the person.

The customer item recommending apparatus collects statistical data 362 related to a purchase action of the customer occurring in a physical store. For example, when a customer purchases a product on sale in the physical store, the customer item recommending apparatus adds a purchase count of the corresponding product to the statistical data 362 with a customer ID of the corresponding customer. Herein, the physical store refers to a store occupying a physical area.

The customer item recommending apparatus determines a preference of the customer based on feature vectors 363 corresponding to individual items corresponding to the fashion category included in the purchase tendency model 350. The customer item recommending apparatus determines the preference of the customer by analyzing features of the customer based on the determined purchase tendency model 350. For example, the customer item recommending apparatus estimates the preference of the customer from the partial image 320. Feature vectors extracted from the partial image 320 indicating items worn by the customer are vectors abstracting an image including items that a customer cluster prefers. Further, the feature vectors 363 with respect to the individual items are vectors abstracting an image including items that customers belonging to the corresponding customer cluster prefer. In an example, a probability of a customer preferring an item having a feature vector similar to the feature vectors with respect to the partial image 320 is relatively high in the purchase tendency model 350. Thus, the customer item recommending apparatus retrieves items having feature vectors similar to the feature vectors extracted from the partial image 320 of the customer, among items corresponding to the fashion category included in the purchase tendency model 350.

For example, the customer item recommending apparatus retrieves clothing items having feature vectors similar to those of the partial image 320 of the customer, among clothing items included in the purchase tendency model 350, for example, tops and bottoms. The customer item recommending apparatus provides recommendation information suitable for the preference of the customer by recommending the retrieved items to the customer.

The feature vectors 352 corresponding to the non-fashion category include a plurality of vector components. The vector components included in the feature vectors 352 corresponding to the non-fashion category are non-fashion elements corresponding to different classes. The non-fashion elements indicate, for example, brands and types of electronic products purchased by the customer. However, the non-fashion category is not limited thereto. The non-fashion category may include classes indicating various items other than fashion items and vary depending on a design.

Figure 4:
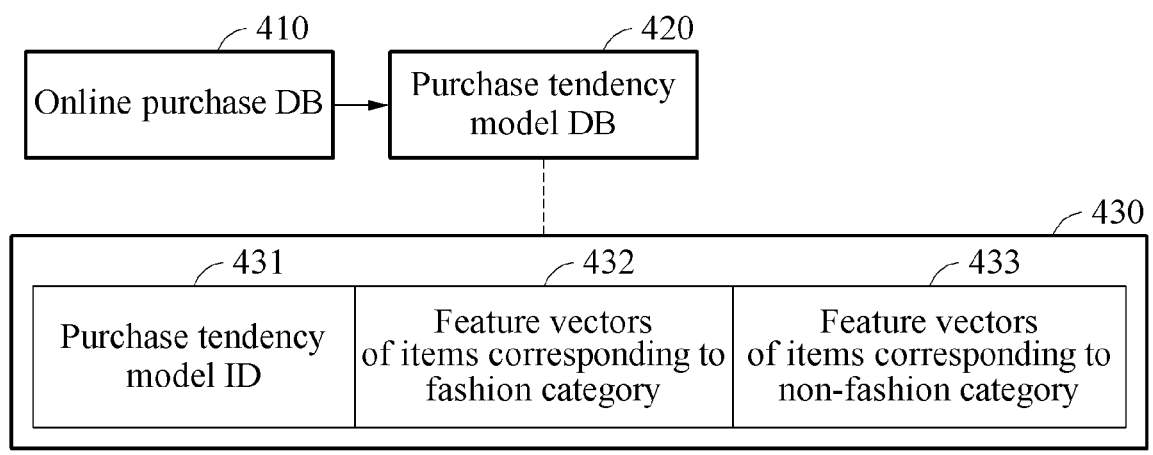
FIG. 4 illustrates an example of building a purchase tendency model based on an online purchase database.

FIG. 4 illustrates an example of building a purchase tendency model based on an online purchase database.

The customer item recommending apparatus builds a purchase tendency model database 420 based on an online purchase database 410. The online purchase database 410 includes a large volume of records related to items, for example, products, purchased by a number of customers. The online purchase database 410 includes a customer ID, an item purchased by the corresponding customer, and browsing records of the corresponding customer. However, examples are not limited thereto. For example, the items purchased by the customers include items corresponding to a fashion category and items corresponding to a non-fashion category.

The customer item recommending apparatus learns statistics of online purchase records of the customers from the online purchase database 410. The statistics of the online purchase records of the customers include a purchase history matrix with respect to M items and N customers. The purchase history matrix indicates product purchase histories of the customers. Here, N and M are integers greater than or equal to "1". An element in an i-th row and a j-th column of the purchase history matrix indicates purchase records of an i-th customer with respect to a j-th item. i is an integer greater than or equal to "1" and less than or equal to "N", and j is an integer greater than or equal to "1" and less than or equal to "M".

The customer item recommending apparatus determines unique values of the customers from a result of decomposing the purchase history matrix, for example, customer-item link vectors. The unique values are expressed in a form of customer feature vectors. Calculation of the customer feature vectors will be described with reference to FIG. 6.

The customer item recommending apparatus classifies customers into a plurality of customer clusters by clustering the customers based on customer feature vectors of the customers. The customer item recommending apparatus calculates a similarity level between the customers based on an inner product between the customer feature vectors of the individual customers. The customer item recommending apparatus classifies the customers into individual customer clusters based on the similarity level between the customers. The individual customer clusters are clusters each including customers having similar purchase histories.

The customer item recommending apparatus determines a unique value of a corresponding category based on category, for example, the fashion category or the non-fashion category, purchase data with respect to each of the plurality of customer clusters. The unique value of the category is, for example, a purchase tendency feature vector with respect to the corresponding category.

The customer item recommending apparatus generates, for each individual customer cluster, a purchase tendency model 430 corresponding to the customer cluster. The purchase tendency model 430 includes various feature vectors representing the corresponding cluster. For example, the customer item recommending apparatus determines the purchase tendency feature vector of each customer by decomposing the purchase history matrix.

In an example, the customer feature vector is a feature vector abstracting purchase attributes of actual customers. Further, the purchase tendency feature vector is a feature vector indicating a purchase tendency of a virtual customer representing a customer cluster into which actual customers are clustered. Calculation of the customer feature vector and the purchase tendency feature vector will be described with reference to FIG. 5.

For example, a purchase tendency model 430 mapped to a customer cluster includes a purchase tendency model ID 431 indicating the corresponding customer cluster, and feature vectors representing the corresponding customer cluster, for example, feature vectors 432 of items corresponding to a fashion category and feature vectors 433 of items corresponding to a non-fashion category.

In an example, the customer item recommending apparatus assigns, to an individual customer cluster, the purchase tendency model 430 including the purchase tendency model ID 431, the feature vectors 432 of the items corresponding to the fashion category, and the feature vectors 433 of the items corresponding to the non-fashion category. The customer item recommending apparatus generates the purchase tendency model 430 by determining the feature vector of the corresponding customer cluster for each category based on a purchase history matrix of each customer cluster.

Figure 5:
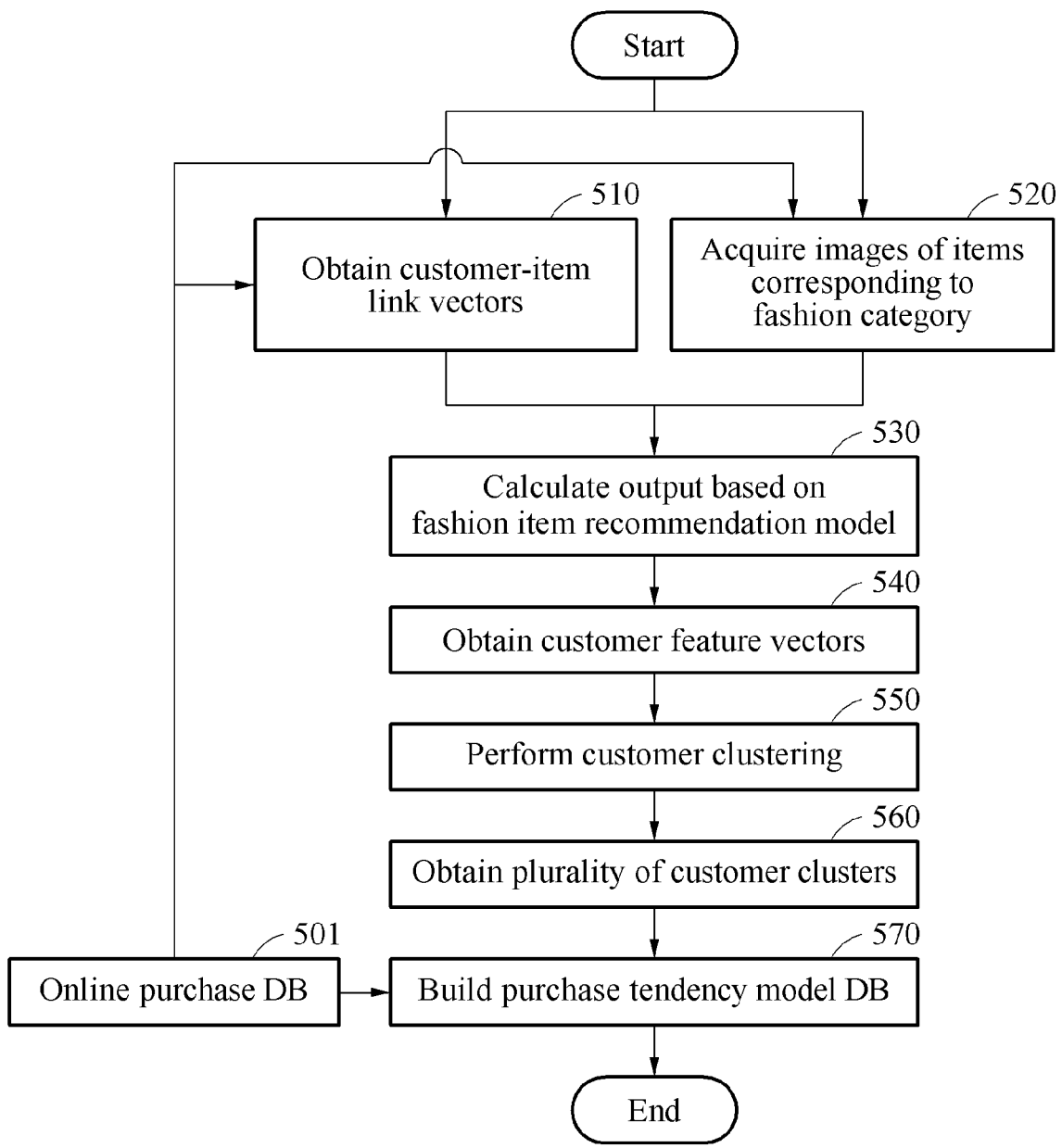
FIG. 5 illustrates an example of building a purchase tendency model based on deep learning.

FIG. 5 illustrates an example of building a purchase tendency model based on deep learning. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here.

In operation 510, the customer item recommending apparatus extracts customer-item link vectors from an online purchase database 501. A customer-item link vector is a vector indicating items purchased by a customer. For example, a length of the customer-item link vector corresponds to a number of types of the items. In an example, the customer-item link vector is generated based on one-hot encoding. For example, when a customer purchases an item, a customer-item link vector with respect to the corresponding customer has value of an element corresponding to the item as "1". Conversely, when the customer does not purchase the corresponding item, the value of the element corresponding to the item is "0" in the corresponding customer-item link vector.

In operation 520, the customer item recommending apparatus acquires item images of items corresponding to a fashion category from the online purchase database 501.

In operation 530, the customer item recommending apparatus calculates an output based on a fashion item recommendation model. The fashion item recommendation model is a model, for example, a neural network, designed to output a result of predicting whether a predetermined customer will purchase a predetermined item corresponding to a fashion category. The customer item recommending apparatus trains the fashion item recommendation model based on a large volume of the customer-item link vectors and the images of the items corresponding to the fashion category, with respect to the items corresponding to the fashion category.

For example, the customer item recommending apparatus inputs the customer-item link vectors of the corresponding customer and the items image of the items corresponding to the fashion category into the fashion item recommendation model. The fashion item recommendation model generates the output in a form of a decimal between "0" and "1". The output of the fashion item recommendation model indicates a probability of the corresponding customer purchasing the items corresponding to the fashion category. An output relatively close to "0" indicates a relatively low probability, and an output relatively close to "1" indicates a relatively high probability.

In operation 540, the customer item recommending apparatus obtains customer feature vectors. For example, the customer item recommending apparatus determines feature vectors output from a hidden layer disposed before an output layer of the fashion item recommendation model to be the customer feature vectors. The fashion item recommendation model includes a plurality of hidden layers, and outputs of the hidden layers indicate information abstracting a purchase tendency of a predetermined customer. For example, the customer feature vectors are feature vectors extracted from the customer-item link vectors based on the hidden layers of the fashion item recommendation model. The extraction of the customer feature vectors will be described further with reference to FIG. 6.

In operation 550, the customer item recommending apparatus performs customer clustering. For example, the customer item recommending apparatus obtains customer feature vectors of a number of customers of the online purchase database 501 as described in operation 540, and clusters the customers based on the customer feature vectors of the customers.

In operation 560, the customer item recommending apparatus obtains a plurality of customer clusters. For example, the customer item recommending apparatus classifies customers having similar customer feature vectors as the same customer cluster. Customers belonging to each customer cluster have similar item purchase tendencies. Each customer cluster is regarded as a virtual customer having a representativeness.

In operation 570, the customer item recommending apparatus builds a purchase tendency model database. For example, the customer item recommending apparatus obtains purchase records of the virtual customer having the representativeness from the online purchase database 501. From the purchase records of the online purchase database 501, the customer item recommending apparatus builds a customer-item link matrix with respect to the virtual customer having the representativeness of each customer cluster. The customer item recommending apparatus obtains purchase tendency feature vectors with respect to items corresponding to different categories, for example, a fashion category and a non-fashion category, by decomposing the customer-item link matrix with respect to the customer representing each customer cluster. The purchase tendency model includes the purchase tendency feature vectors with respect to the items corresponding to different categories.

Figure 6:
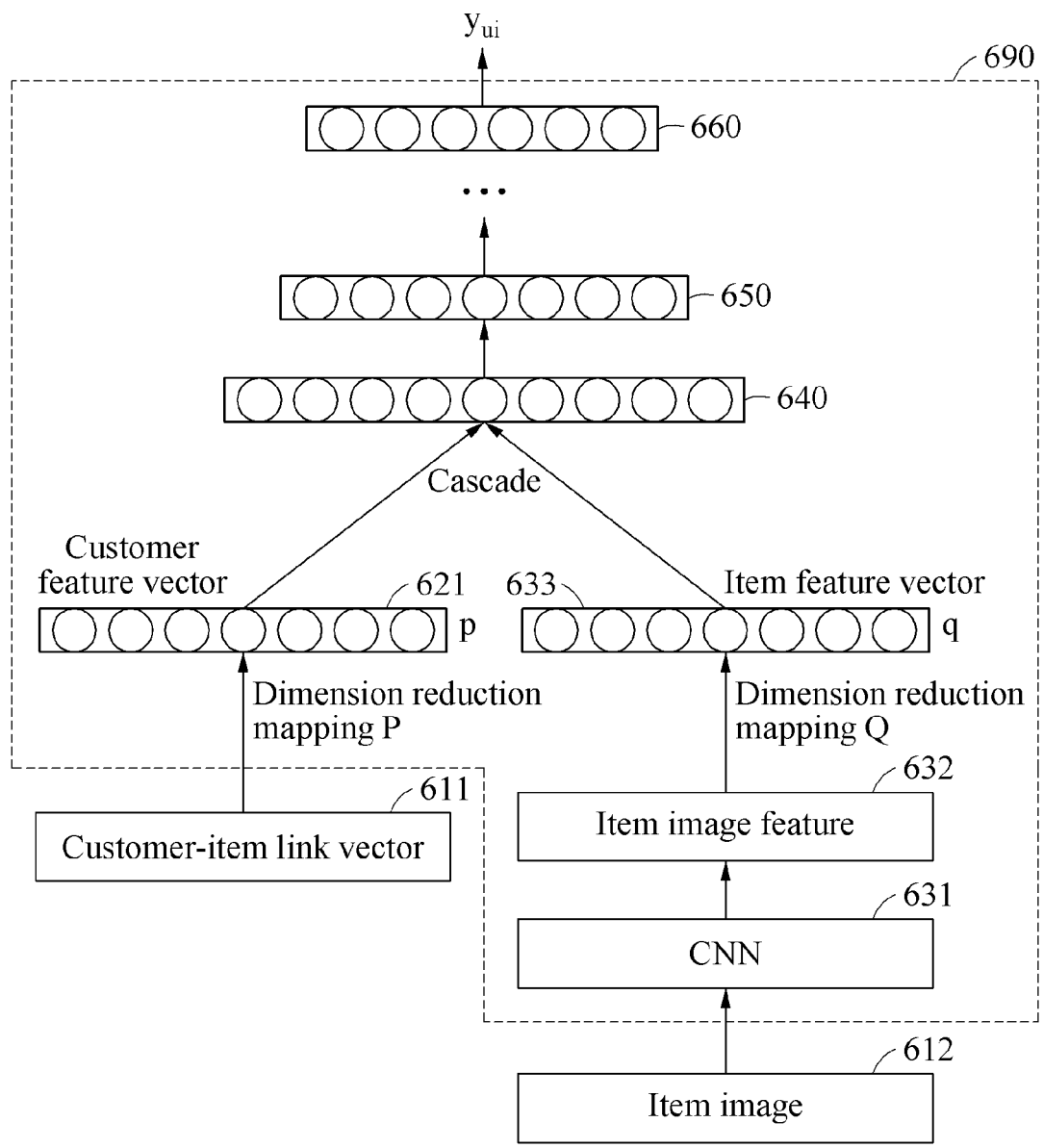
FIG. 6 illustrates an example of a deep neural network designed to output a feature score from an item corresponding to a fashion category.

FIG. 6 illustrates an example of a deep neural network designed to output a feature score from an item corresponding to a fashion category.

The customer item recommending apparatus inputs two types of vectors into a fashion item recommendation model 690.

For example, the customer item recommending apparatus inputs a customer-item link vector 611. The customer item recommending apparatus applies dimension reduction mapping to the customer-item link vector 611. Dimension reduction mapping is, for example, a single-matrix operation, but is not limited thereto, and may be a neural network operation. For example, if the customer-item link vector 611 before the dimension reduction is K-dimensional, and a vector after the dimension reduction is L-dimensional, the technique of Matrix Factorization Techniques for Recommender Systems (Y. Koren et al., August 2009, IEEE Computer) is applied to the customer-item link vector 611. Here, K and L are integers greater than or equal to "1", and K is greater than L. In another example, the customer item recommending apparatus reduces a dimension of the customer-item link vector 611 through a neural network operation of a multiple layer perceptron (MLP) structure. When dimension reduction mapping P is implemented by a first hidden layer 621, the customer item recommending apparatus determines the dimension-reduced customer-item link vector 611 to be the customer feature vector. For example, a customer-item link vector 611 with respect to a u-th customer is denoted as $v_u$, and the customer feature vector is denoted as $p=P^T v_u$. Here, u is an integer greater than or equal to "1".

Further, the customer item recommending apparatus inputs an item image 612. The customer item recommending apparatus extracts an item image feature 632 by inputting the item image 612 into a convolutional neural network (CNN) 631. The item image feature 632 is a vector abstracting a visual feature of a corresponding item. The customer item recommending apparatus obtains an item feature vector by applying dimension reduction mapping Q to the vector abstracting the visual feature of the item through a second hidden layer 633. For example, an image feature 632 extracted from an item image 612 of an i-th fashion category through the CNN 631 is denoted as $v_i$, and an item feature vector is denoted as $q=Q^T v_i$. Here, i is an integer greater than or equal to "1".

In an example, the customer item recommending apparatus integrates the customer feature vector and the item feature vector through a cascade layer 640. The customer item recommending apparatus inputs the integrated feature vector into a single coding neural network. The number of nodes of middle layers 650 of the coding neural network decreases toward an upper position. The middle layers 650 are, for example, neural collaborative filtering layers, in detail, layers trained with respect to an interaction, for example, a correlation, between a customer feature vector p and an item feature vector q.

An output layer 660 of the coding neural network outputs a value between "0" and "1" as an output $y_{ui}$. The output $y_{ui}$ indicates a probability of a u-th customer purchasing an item corresponding to an i-th fashion category. As the output $y_{ui}$ is relatively close to "1", a probability of the u-th customer purchasing the item of the i-th fashion category is relatively high.

The customer item recommending apparatus generates a large volume of training data for the fashion item recommendation model 690 from the online purchase database. Further, the customer item recommending apparatus trains the fashion item recommendation model 690 through a back-propagation algorithm.

Figure 7:
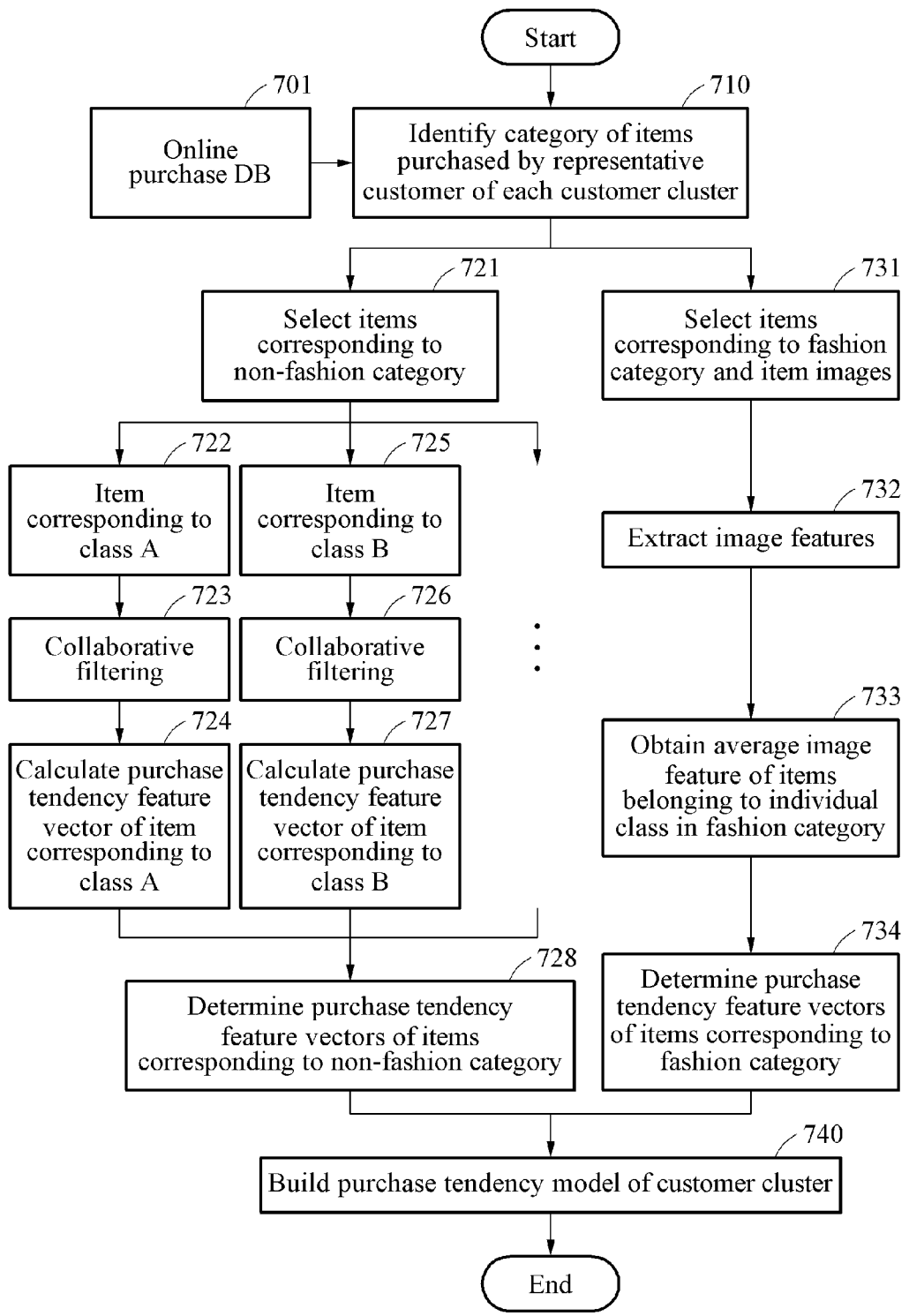
FIG. 7 illustrates an example of building a feature vector corresponding to an item corresponding to each category with respect to each customer group.

FIG. 7 illustrates an example of building a feature vector corresponding to an item corresponding to each category with respect to each customer group.

In operation 710, the customer item recommending apparatus identifies a category of items purchased by a representative customer of each customer cluster. The representative customer of each customer cluster is, for example, a virtual customer representing the corresponding cluster. The customer item recommending apparatus retrieves items purchased by respective customers belonging to the customer cluster from an online purchase database 701. By assuming each customer cluster as a single virtual customer having a representativeness, the customer item recommending apparatus retrieves items purchased by the virtual customer having the representativeness.

In operation 721, the customer item recommending apparatus selects items corresponding to a non-fashion category. For example, the customer item recommending apparatus selects the items corresponding to the non-fashion category, among the items purchased by the representative customer representing the customer cluster.

In operations 722 and 725, the customer item recommending apparatus builds a purchase history matrix based on customer-item link vectors with respect to an item corresponding to a class A and an item corresponding to a class B of the non-fashion category.

In operations 723 and 726, the customer item recommending apparatus decomposes the purchase history matrix using collaborative filtering.

In operations 724 and 727, the customer item recommending apparatus calculates a purchase tendency feature vector of the item corresponding to the class A and a purchase tendency feature vector of the item corresponding to the class B through the decomposition of the purchase history matrix.

In operation 728, the customer item recommending apparatus determines purchase tendency feature vectors of the items corresponding to the non-fashion category, based on the purchase tendency feature vector corresponding to the respective classes belonging to the non-fashion category.

In operation 731, the customer item recommending apparatus selects items corresponding to a fashion category and images of items corresponding to the fashion category.

In operation 732, the customer item recommending apparatus extracts image features of the item images.

In operation 733, the customer item recommending apparatus obtains an average image feature of items belonging to an individual class of the fashion category. For example, the customer item recommending apparatus obtains the average image feature by calculating an average of image features with respect to a number of item images belonging to the individual class, for example, tops, of the fashion category.

In operation 734, the customer item recommending apparatus determines purchase tendency feature vectors of the items corresponding to the fashion category.

In operation 740, the customer item recommending apparatus generates a purchase tendency model with respect to the customer cluster based on the purchase tendency feature vectors of the items corresponding to the non-fashion category and the purchase tendency feature vectors of the items corresponding to the fashion category.

Figure 8:
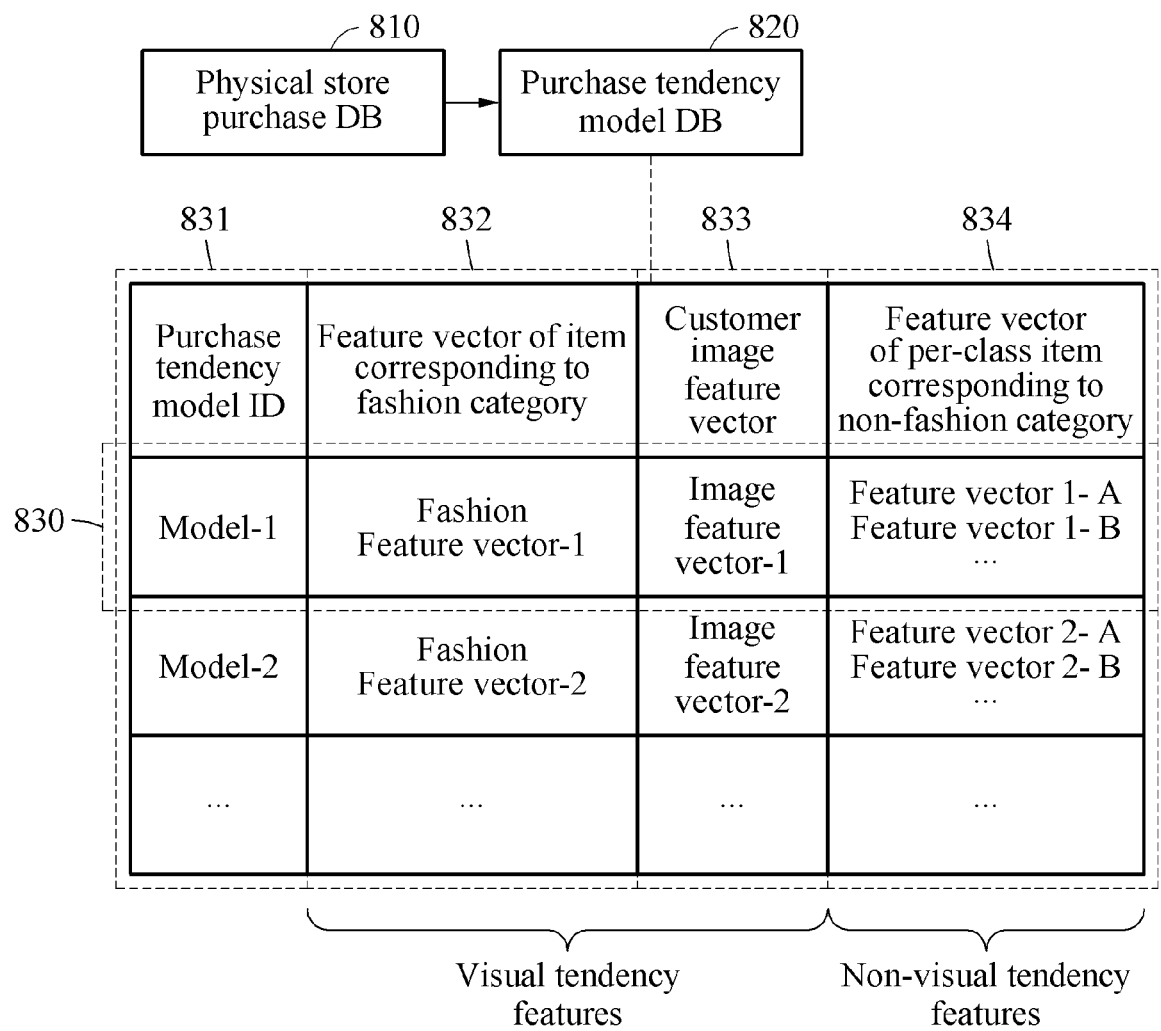
FIG. 8 illustrates an example of building a purchase tendency model based on a physical store purchase database.

FIG. 8 illustrates an example of building a purchase tendency model based on a physical store purchase database.

FIG. 8 describes an example of building a purchase tendency model 830 through a physical store purchase database 810. The physical store purchase database 810 includes a customer ID, an image of a customer, and purchase records of the customer.

Information obtainable through an image analysis with respect to a customer image includes appearance information of a customer and purchase action information of the customer. The appearance information of the customer includes information such as, for example, an age, a gender, a hairstyle, a clothing feature, a hair accessory feature, an accessory brand feature, an ethnic group, a gaze direction, and a facial expression of the customer. The purchase action information of the customer includes information such as, for example, traces of the customer in a physical store, a time during which the customer stays in a different area of the physical store, a travel route in the store, a conversation, and an interaction with an item.

The customer item recommending apparatus classifies customers into a plurality of clusters based on information obtained from customer images. For example, the customer item recommending apparatus extracts customer feature vectors from the purchase action information, for example, customer-item link vectors, and clusters the customers based on the customer feature vectors.

The customer item recommending apparatus calculates a feature vector of a corresponding category based on per-category purchase data with respect to each of a plurality of customer clusters. For example, a purchase tendency model database 820 includes a purchase tendency model 830 corresponding to a customer cluster classified based on customer feature vectors. For each customer cluster, the customer item recommending apparatus obtains statistics of purchase data related to items of different categories. The customer item recommending apparatus calculates a feature vector for each of the items of different categories.

The purchase tendency model 830 built with respect to each customer cluster includes feature vectors 832 of items corresponding to a fashion category, feature vectors 833 of a customer image, and feature vectors 834 of items corresponding to a non-fashion category. A purchase tendency model ID 831 is mapped to each purchase tendency model 830.

The customer item recommending apparatus obtains a customer image with respect to a target customer. The customer item recommending apparatus extracts image features of the corresponding customer from the customer image. The image features of the customer include, for example, an image feature of a face of the customer and an image feature of an item image with respect to an individual item worn by the customer. The customer item recommending apparatus retrieves a purchase tendency model 830 appropriate for the customer from the purchase tendency model database 820 based on the extracted image feature, the feature vectors of the items corresponding to the fashion category, the feature vectors of the customer image, and the feature vectors of the items corresponding to the non-fashion category included in each purchase tendency model 830. The customer item recommending apparatus calculates a correlation level between the customer and each purchase tendency model based on the image feature of the customer, the feature vectors of the items corresponding to the fashion category, the feature vectors of the customer image, and the feature vectors of the items corresponding to the non-fashion category. The customer item recommending apparatus selects a purchase tendency model having a highest correlation level with respect to the corresponding customer, among a plurality of purchase tendency models. The correlation level indicates a level of mutual connection between a customer and a purchase tendency model. The correlation level is, for example, an average of inner products calculated between a feature vector of the purchase tendency model and feature vectors of items worn by the customer. However, examples are not limited thereto.

For example, the customer item recommending apparatus calculates an inner product between an image feature vector of the corresponding customer and a vector related to a visual feature of each of all purchase tendency models. The customer item recommending apparatus determines a purchase tendency model 830 corresponding to a greatest inner product among inner products respectively obtained for individual purchase tendency models to be the purchase tendency model 830 appropriate for the corresponding customer.

Figure 9:
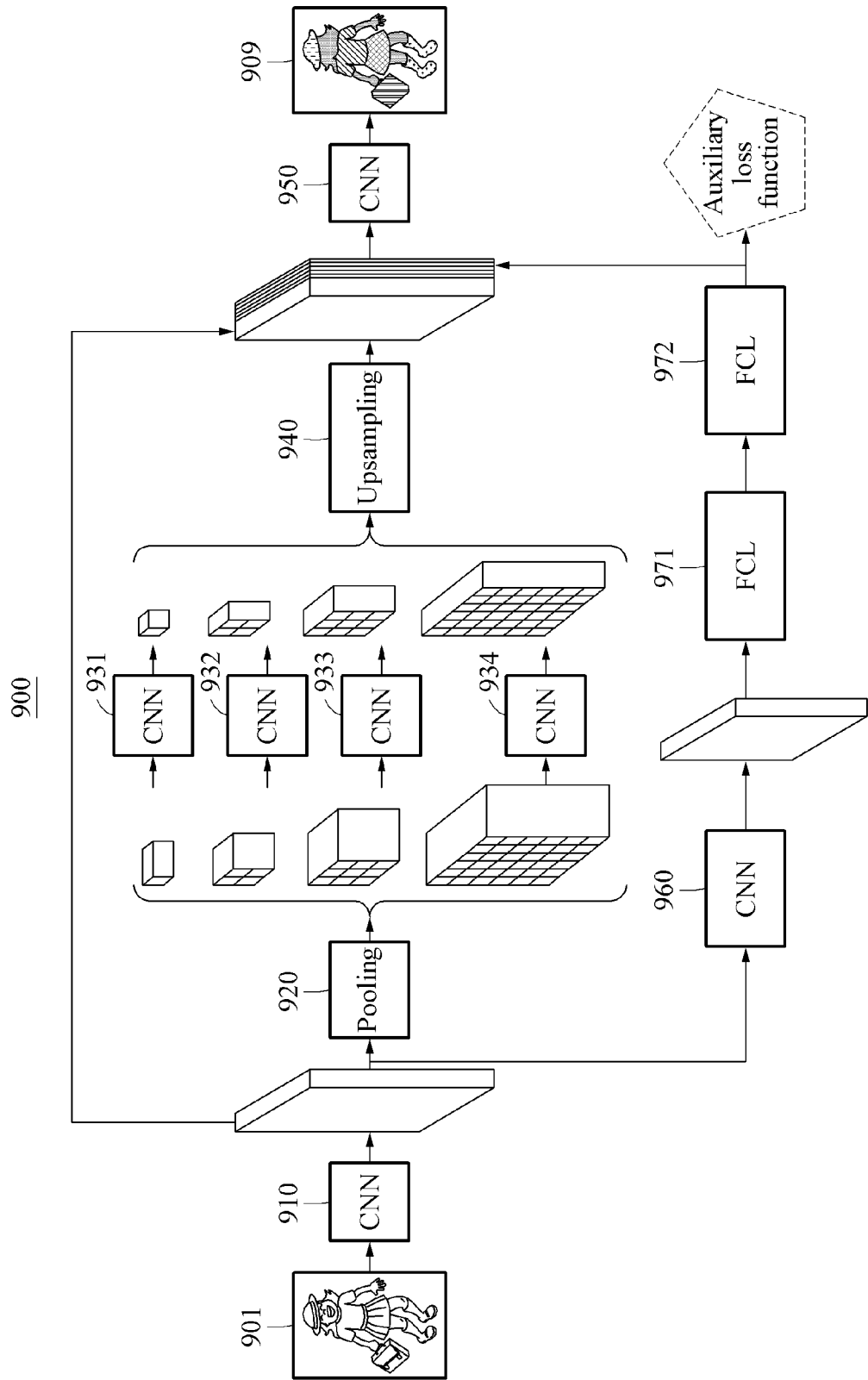
FIG. 9 illustrates an example of a neural network designed to segment a customer image.

FIG. 9 illustrates an example of a neural network designed to segment a customer image.

The customer item recommending apparatus segments a customer image 901 based on an image segmentation model 900. For example, the customer item recommending apparatus segments the customer image 901 into a background and an item image based on the image segmentation model 900. The image segmentation model 900 is implemented in a machine learning structure as shown in FIG. 9. However, examples are not limited thereto. For example, the image segmentation model 900 may include a neural network.

The image segmentation model 900 includes a CNN 910 that receives the customer image 901. Feature data extracted based on the CNN 910 is propagated to a pooling layer 920. The pooling layer 920 is connected to a plurality of CNNs 931, 932, 933, and 934. The plurality of CNNs 931, 932, 933, and 934 includes respective kernels of different sizes. The image segmentation model 900 is designed to perform upsampling 940 with respect to outputs of the plurality of CNNs 931, 932, 933, and 934.

Further, the feature data extracted based on the CNN 910 is propagated to another CNN 960. An output of the CNN 960 is propagated to fully connected layers 971 and 972. An output of the fully connected layer 972 is used to calculate an auxiliary loss function during a training process.

The output of the fully connected layer 972 and an output of the upsampling 940 are propagated to an output CNN 950. The output CNN 950 generates an image 909 by segmenting the customer image 901. For example, the image 909 obtained by segmenting the customer image 901 indicates a category and a class of each of pixels constituting the customer image 901. The image 909 obtained by segmenting the customer image 901 classifies the pixels in categories such as, for example, a background, a hat, hair, a face, sunglasses, a scarf, a top, an over skirt, a coat, gloves, pants, a dress, a miniskirt, a left arm, a right arm, a left leg, a right leg, a left foot, a right foot, socks, a bag, a hair accessory, and a watch.

The customer item recommending apparatus extracts an image window corresponding to an item corresponding to a different fashion category from the customer image 901 based on a result of classifying the pixels. Further, the customer item recommending apparatus removes obstructive elements, for example, a color and a pattern of a background object, by removing pixels classified as the background from the image window corresponding to the individual item. The image window is also referred to as a partial image.

Figure 10:
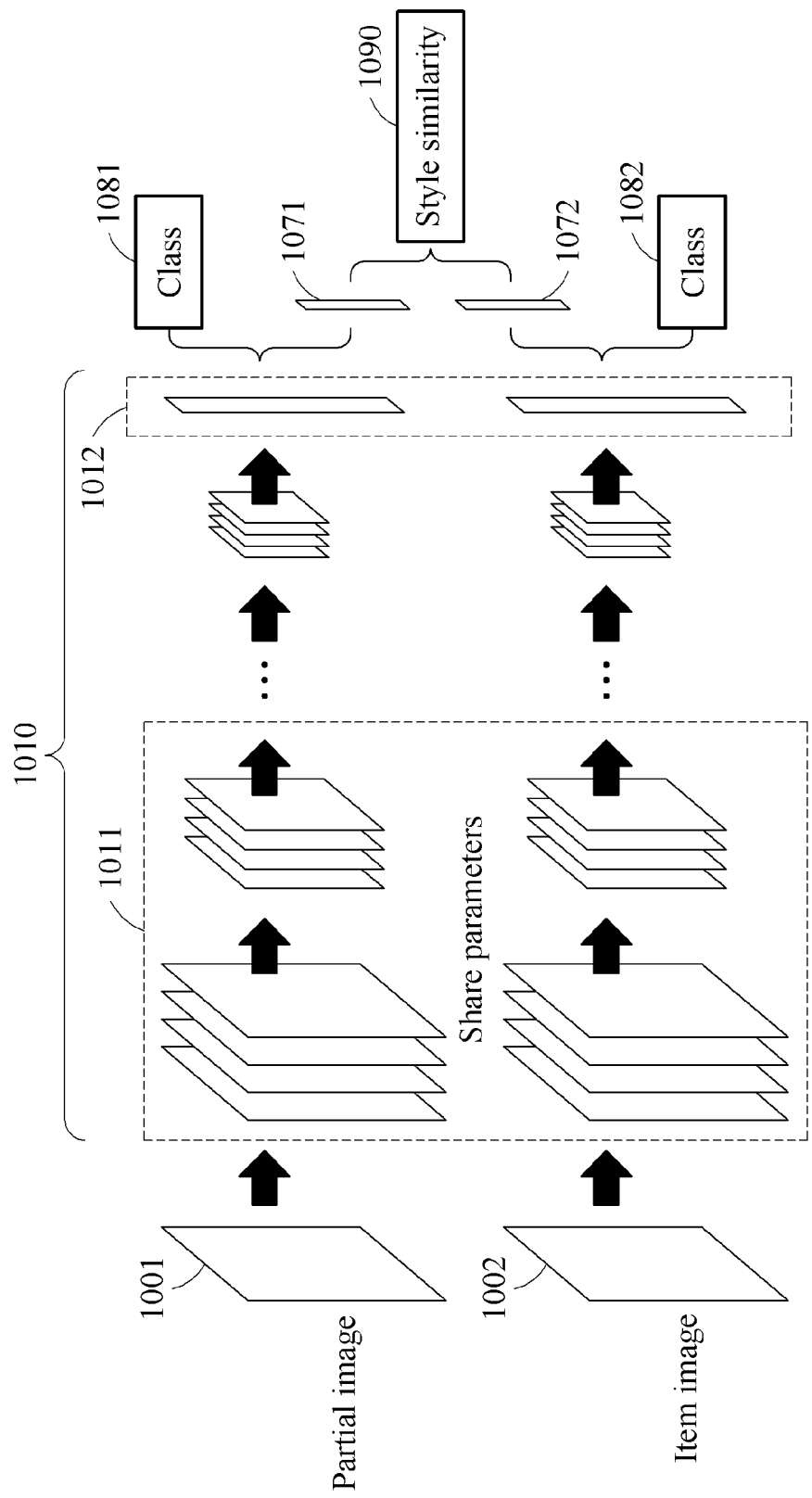
FIG. 10 illustrates an example of a neural network designed to match an image obtained by segmenting a customer image and an item image.

FIG. 10 illustrates an example of a neural network designed to match an image obtained by segmenting a customer image and an item image.

When the customer image of the target customer is acquired, the customer item recommending apparatus extracts a partial image 1001 corresponding to an item, for example, clothing, worn by the target customer. For example, as described above with reference to FIG. 9, the customer item recommending apparatus extracts an image window corresponding to an individual item as the partial image 1001. The customer item recommending apparatus retrieves an image including a most appropriate style with respect to the partial image 1001, from item images 1002 corresponding to the fashion category managed by a purchase tendency model selected for the target customer.

For reference, a feature of an image of clothing being worn and a feature of an image of clothing being displayed at an online shopping site show remarkable differences despite the same clothing style. The customer item recommending apparatus evaluates a style fitness between a customer image, for example, the partial image 1001, of a customer cluster and an item image 1002 corresponding to a fashion category based on a style comparison model, for example, a neural network. The style comparison model is a modal trained to output a fitting score indicating a style similarity 1090 between the two item images.

As shown in FIG. 10, the customer item recommending apparatus includes a neural network having a multitasking twin convolutional network structure 1010. At least a portion 1011 of the neural network includes a first branch convolutional network that extracts a feature from a customer image, for example, the partial image 1001, and a second branch convolutional network that extracts a feature from the item image 1002 corresponding to a fashion category. The first branch convolutional network and the second branch convolutional network share the same parameters. The parameters of the neural networks are, for example, connection weights.

At an output layer 1012 of the neural network, the first branch convolutional network outputs classes 1081, for example, tops, bottoms, bags and sunglasses, of items corresponding to the fashion category from the partial image 1001. At the output layer 1012, the second branch convolutional network outputs classes 1082 of items corresponding to the fashion category from the item image 1002. In an example, the classes 1081 of the item image 1002 and the classes 1082 of the partial image 1001 are the same as each other. In another example, the classes 1081 of the item image 1002 and the classes 1082 of the partial image 1001 are different from each other.

The customer item recommending apparatus also outputs embedding vectors 1071 and 1072 at the output layer 1012 of the first branch convolutional network and the second branch convolutional network. The customer item recommending apparatus calculates the style similarity 1090 between the partial image 1001 and the item image 1002 based on the two embedding vectors 1071 and 1072. For example, the customer item recommending apparatus calculates an inner product between the two embedding vectors 1071 and 1072. The inner product between the two embedding vectors 1071 and 1072 indicates the style similarity 1090 between the two images. For example, the style similarity 1090 between the two images is expressed as a fitting score.

Further, the customer item recommending apparatus trains the style comparison model based on a loss function according to Equation 1. For example, the customer item recommending apparatus trains the style comparison model by updating parameters of the style comparison model based on a loss according to Equation 1.

$$\text{Loss} = \sum_{(f_p, f_q)} L_{pos}(f_p, f_q) + \sum_{(f_n, f_q)} L_{neg}(f_n, f_q) \quad \text{[Equation 1]}$$

In Equation 1, $L_{pos}$ and $L_{neg}$ are expressed by Equation 2 and Equation 3, respectively.

$$L_{pos}(f_p, f_q) = \text{StyleSim}(f_p, f_q) \quad \text{[Equation 2]}$$

$$L_{neg}(f_n, f_q) = \max(0, m - \text{StyleSim}(f_n, f_q)) \quad \text{[Equation 3]}$$

In Equations 1 through 3, it is assumed that an image pair of (Iq, Ip) has the same style, and an image pair of (Iq, In) has different styles. The customer item recommending apparatus obtains embedding vectors fq, fp, and fn by mapping each of the images Iq, Ip, and In to an embedding layer. The loss function Loss of Equation 1 has two penalties. $L_{pos}$ denotes a function that penalizes a positive pair that is too far apart, and $L_{neg}$ denotes a function that penalizes a negative pair that is too closer than a margin m. StyleSim(fp, fq) denotes a function that calculates a similarity, for example, a vector inner product, between fp and fq, and StyleSim(fn, fq) denotes a function that calculates a similarity between fn and fq.

Figure 11:
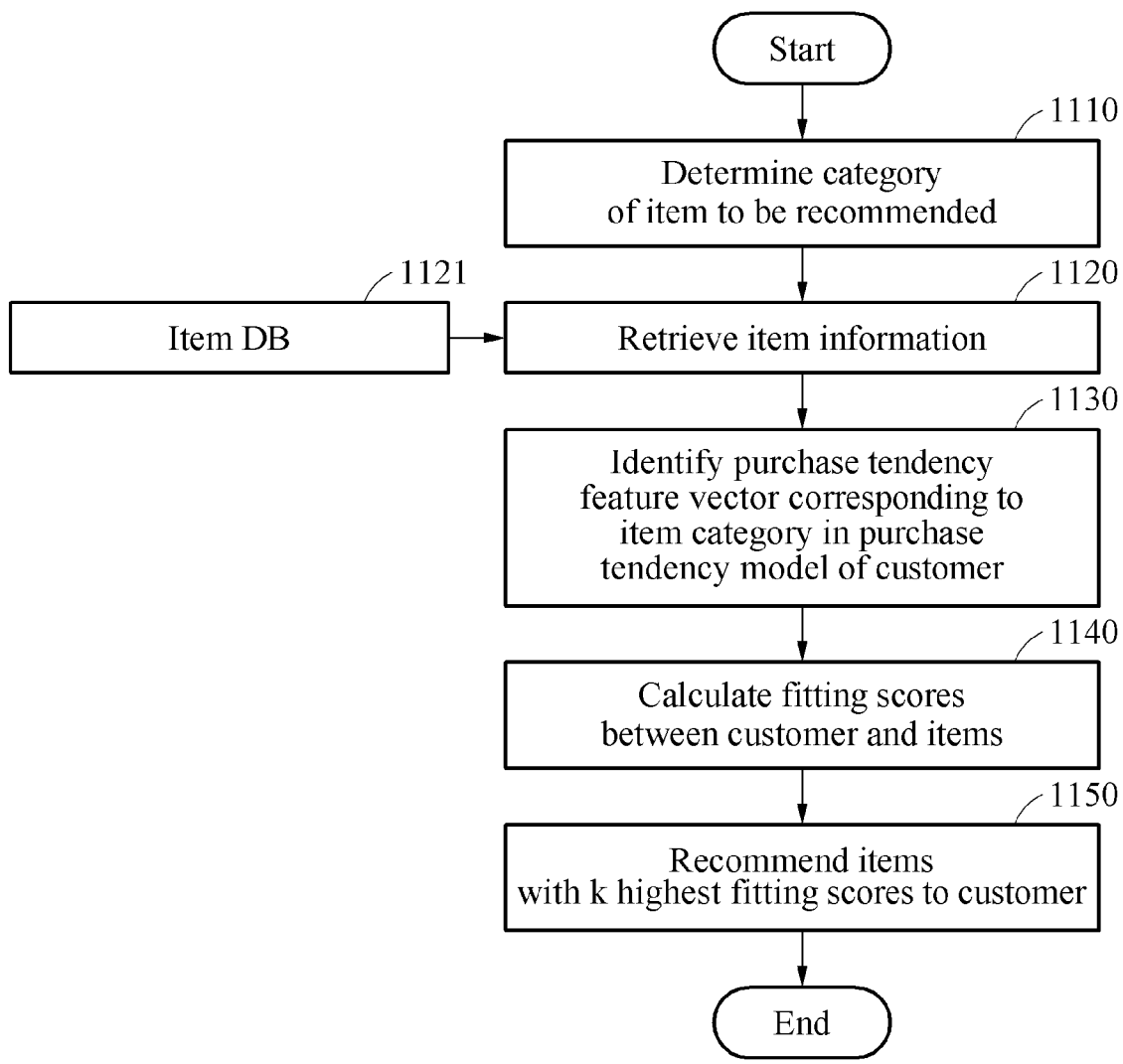
FIG. 11 illustrates an example of recommending an item based on an identified customer purchase tendency.

FIG. 11 illustrates an example of recommending an item based on an identified customer purchase tendency. The operations in FIG. 11 may be performed in the sequence and manner as shown, although the order of some operations may be changed or some of the operations omitted without departing from the spirit and scope of the illustrative examples described. Many of the operations shown in FIG. 11 may be performed in parallel or concurrently. One or more blocks of FIG. 11, and combinations of the blocks, can be implemented by special purpose hardware-based computer that perform the specified functions, or combinations of special purpose hardware and computer instructions. In addition to the description of FIG. 11 below, the descriptions of FIGS. 1-10 are also applicable to FIG. 11, and are incorporated herein by reference. Thus, the above description may not be repeated here.

The customer item recommending apparatus matches an item image of an item and a customer image, with respect to an item corresponding to each category in a purchase tendency model. For example, as described in FIG. 10, the customer item recommending apparatus calculates a fitting score between the item image and the customer image based on a neural network. The customer item recommending apparatus determines a recommended item based on the calculated fitting score.

In operation 1110, the customer item recommending apparatus determines a category of an item to be recommended. For example, the customer item recommending apparatus obtains a user input designating an item category from a target customer and determines the item category based on the user input. In another example, the customer item recommending apparatus calculates a confidence level with respect to an individual category based on a purchase frequency with respect to the individual category, a purchase area where the customer is positioned, and a sales strategy of a store, and determines a category having a highest confidence level. In still another example, the customer item recommending apparatus builds a category model for category recommendation. The customer item recommending apparatus predicts a category to be recommended to the customer using the neural network-based category model.

In operation 1120, the customer item recommending apparatus retrieves item information. The customer item recommending apparatus retrieves the item information corresponding to the category determined in operation 1110 from an item database 1121. The item information stored in the item database 1121 includes feature vectors that abstractly describe attributes of corresponding items. The customer item recommending apparatus obtains the feature vectors of the items by decomposing a matrix according to a collaborative filtering algorithm. A reference may be made to the "Matrix Factorization Techniques for Recommender Systems" with respect to a calculation method of obtaining the feature vectors of the items.

In operation 1130, the customer item recommending apparatus identifies a purchase tendency feature vector corresponding to an item category from the purchase tendency model of the customer. The customer item recommending apparatus identifies a purchase tendency model corresponding to a target customer. For example, the customer item recommending apparatus calculates inner products between feature vectors of the purchase tendency model and feature vectors of items worn by the customer and determines an average of the calculated inner products. The customer item recommending apparatus determines a purchase tendency model having a greatest average of inner products to be the purchase tendency model corresponding to the customer. The customer item recommending apparatus determines the purchase tendency feature vector corresponding to the category determined in operation 1110 from the purchase tendency model.

In operation 1140, the customer item recommending apparatus calculates fitting scores between the customer and the items. For example, the customer item recommending apparatus calculates inner products between the purchase tendency feature vector identified in operation 1130 and the feature vectors of the items obtained in operation 1120 to be the fitting scores.

In operation 1150, the customer item recommending apparatus recommends items having K highest fitting scores to the customer. For example, the customer item recommending apparatus determines items from an item having a highest fitting score to an item having a k-th highest fitting score to be the recommended items. k is an integer greater than or equal to "1".

The customer item recommending apparatus provides recommendation information through the examples described with reference to FIGS. 12 through 15, in response to the recommended items being determined.

Figure 12:
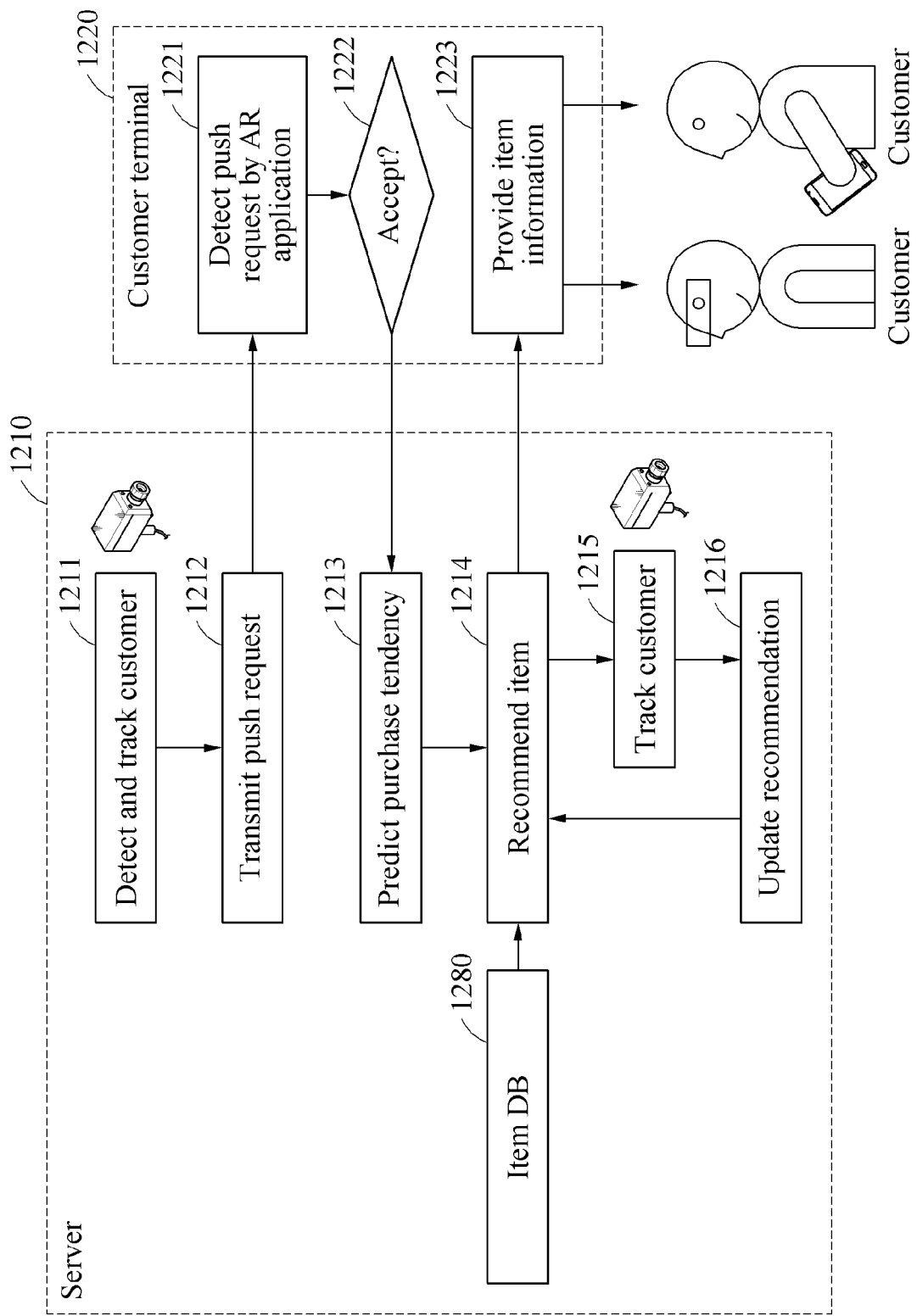
FIG. 12 illustrates an example of recommending an item through an augmented reality (AR) display device of a customer visiting a physical store.

FIG. 12 illustrates an example of recommending an item through an AR display device of a customer visiting a physical store.

In FIG. 12, the customer item recommending apparatus is implemented as a server 1210.

In operation 1211, the server 1210 detects and tracks a customer. For example, the server 1210 detects the customer through a camera in a physical store.

In operation 1212, the server 1210 transmits a push request to a customer terminal 1220. The customer terminal 1220 is, for example, an AR device. The AR device is a device providing an AR and includes devices such as, for example, a helmet, an eyeglass, an AR booth, a TV, a personal computer (PC) including an AR display, and a mobile phone including an AR display.

In operation 1221, an AR application of the customer terminal 1220 detects the push request. For example, the customer terminal 1220 receives the push request transmitted from the server 1210 through wireless communication.

In operation 1222, the customer terminal 1220 determines whether to accept the push request by an AR management application. When the push request is accepted, the customer terminal 1220 transmits information indicating that the push request is accepted to the server 1210. The server 1210 receives the information indicating that the push request is accepted from the customer terminal 1220.

In operation 1213, when the push request is accepted by the customer terminal 1220, the server 1210 predicts a purchase tendency based on a customer image. For example, the server 1210 determines a purchase tendency model corresponding to a customer identified from the customer image, as described above.

In operation 1214, the server 1210 recommends an item. For example, the server 1210 determines a category and a class of the item to be recommended to the customer based on the purchase tendency model. The server 1210 retrieves an item having a relatively high fitting score with respect to the purchase tendency model from an item database 1280. The server 1210 determines the item having the relatively high fitting store to be the recommended item and transmits information associated with the recommended item to the customer terminal 1220.

In operation 1215, the server 1210 continuously tracks the customer. In operation 1216, the server 1210 updates recommendation information based on a state of the customer, while tracking the customer. For example, when the customer is positioned in a fruit area in the physical store, an item corresponding to a fruit category is recommended. In another example, when the customer is positioned in a document area in the physical store, an item corresponding to a document category is recommended.

In operation 1223, the customer terminal 1220 receives item information from the server 1210. The item information is information associated with the item recommended by the server 1210. The customer terminal 1220 provides the item information to the customer by visualizing the item information through AR.

Figure 13:
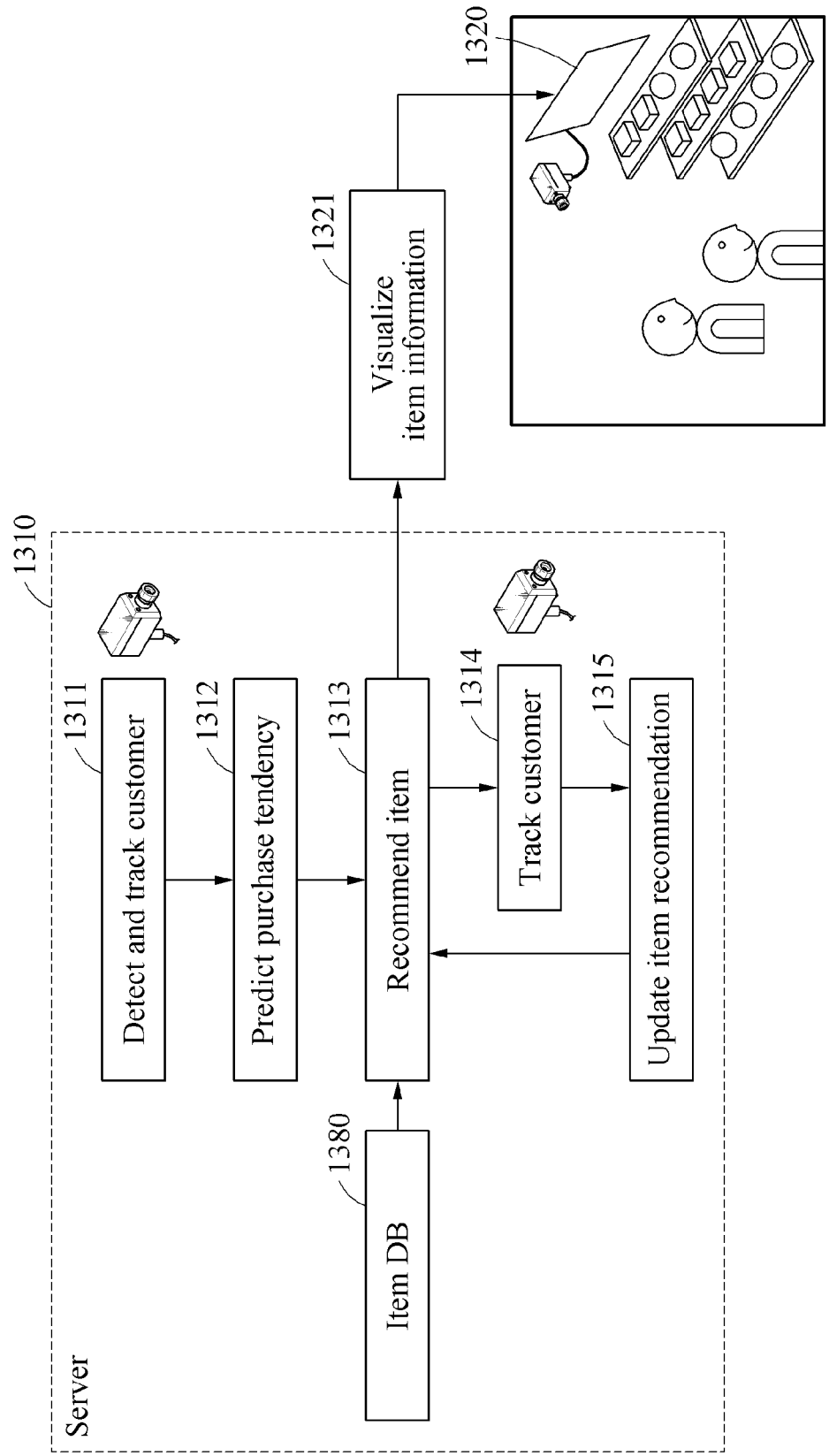
FIG. 13 illustrates an example of providing information associated with an item recommendation through a display in a vicinity of a customer visiting a physical store.

FIG. 13 illustrates an example of providing information associated with an item recommendation through a display in a vicinity of a customer visiting a physical store.

In the example of FIG. 13, the customer item recommending apparatus is implemented as a server 1310.

In operation 1311, the server 1310 detects and tracks a customer. For example, a camera connected with the server 1310 is installed in a vicinity of a product shelf in a physical store.

In operation 1312, the server 1310 predicts a purchase tendency. For example, in operation 1311, when the customer is detected, the server 1310 determines a purchase tendency model corresponding to the customer based on a customer image.

In operation 1313, the server 1310 recommends an item. For example, the server 1310 retrieves an item corresponding to the purchase tendency model from an item database 1380 and determines the retrieved item to be the recommended item. The server 1310 transmits item information related to the recommended item to an additional display 1320. For example, the server 1310 estimates a position of the customer in the physical store and transmits item information related to the recommended item to an additional display 1320 within a threshold distance from the estimated position of the customer.

In operation 1314, the server 1310 continuously tracks the customer. In operation 1315, the server 1310 updates an item recommendation. For example, the server 1310 updates the item recommendation for the customer based on a change in state of the customer being tracked, for example, a change in position of the customer in the physical store.

In operation 1321, the additional display 1320 visualizes the item information. For example, the additional display 1320 is a display installed in the physical store and connected with the server 1310. The additional display 1320 visualizes the item information related to the recommended item determined by the server 1310.

Figure 14:
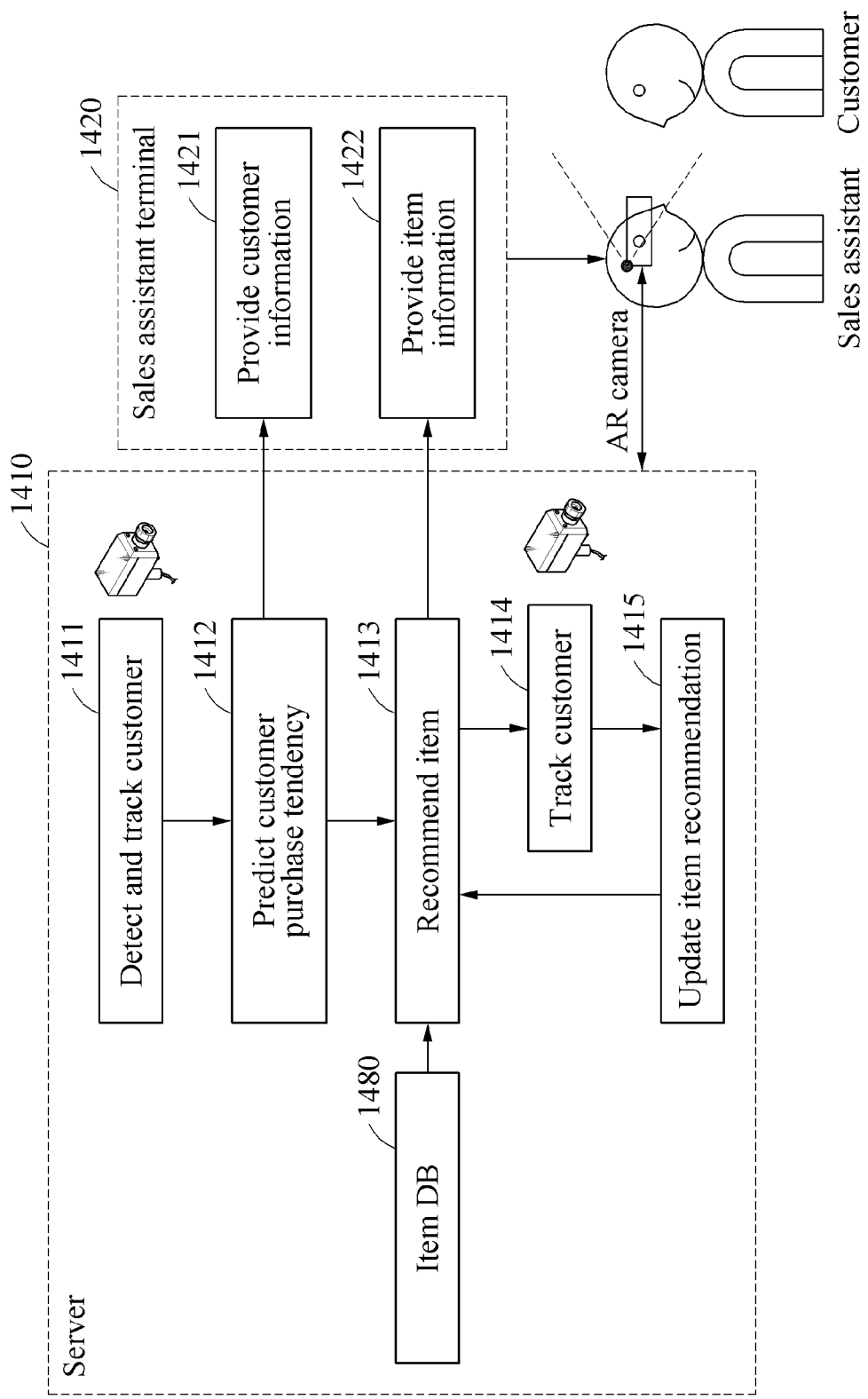
FIG. 14 illustrates an example of providing customer information and an item recommendation through an AR display device mounted by a salesclerk in a physical store.

FIG. 14 illustrates an example of providing customer information and an item recommendation through an AR display device mounted by a salesclerk in a physical store.

In FIG. 14, the customer item recommending apparatus is implemented as a server 1410.

In operation 1411, the server 1410 detects and tracks a customer.

In operation 1412, the server 1410 predicts a purchase tendency of the customer. For example, when the customer is detected by a camera installed in a physical store, the server 1410 determines a purchase tendency model corresponding to the customer based on a customer image.

In operation 1421, a salesclerk terminal 1420 provides customer information. The salesclerk terminal 1420 is implemented as an AR device and described as an AR eyeglass in FIG. 14. The salesclerk terminal 1420 assists a salesclerk by visualizing the customer information identified based on the customer image for the salesclerk. The salesclerk terminal 1420 is also referred to as a work terminal.

In operation 1413, the server 1410 recommends an item. For example, the server 1410 retrieves an item corresponding to a purchase tendency model selected for the corresponding customer from an item database 1480 and determines the retrieved item to be the recommended item.

In operation 1422, the salesclerk terminal 1420 provides item information. For example, the server 1410 provides the item information related to the recommended item to the salesclerk terminal 1420. The salesclerk terminal 1420 visualizes the item information related to the recommended item provided from the server 1410.

In operation 1414, the server 1410 continuously tracks the customer. In operation 1415, the server 1410 updates an item recommendation. For example, in response to a change in state of the customer positioned in front of the salesclerk, the server 1410 updates the item recommendation.

Instead of the salesclerk wearing the salesclerk terminal 1420, a robot may be disposed in the physical store. The robot may visualize an image or chat with the customer. Similar to the method described in FIG. 14, the robot may provide the item information related to the recommended item to the customer.

Thus, the customer item recommending apparatus provides a convenient shopping service to the customer.

Figure 15:
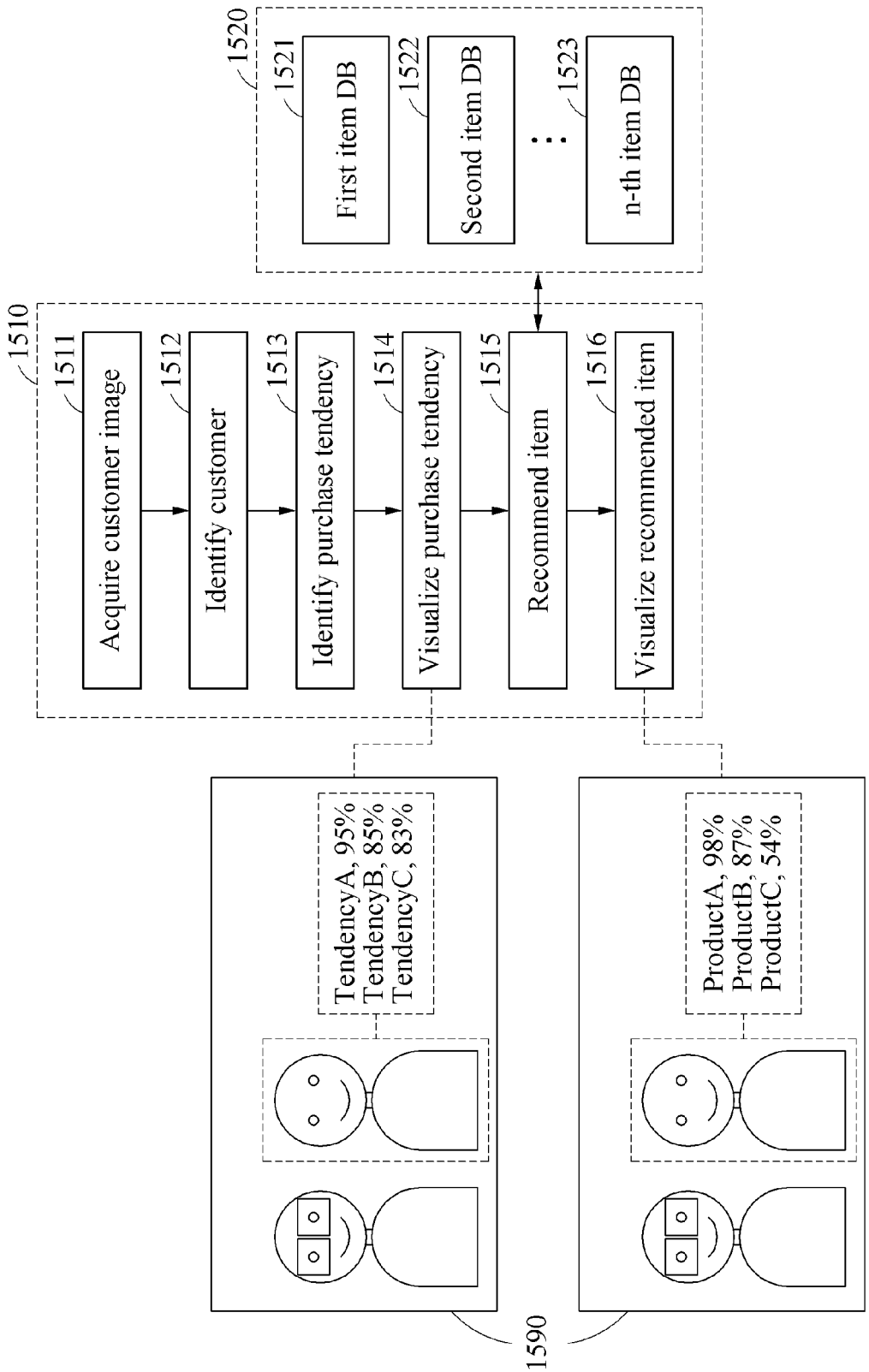
FIG. 15 illustrates an example of providing customer information and information associated with an item recommendation on a face image displayed on a browser.

FIG. 15 illustrates an example of providing customer information and information associated with an item recommendation on a face image displayed on a browser.

In FIG. 15, the customer item recommending apparatus is implemented as a user terminal 1510.

In operation 1511, the user terminal 1510 acquires a customer image. The user terminal 1510 acquires a customer image of at least one customer among a plurality of customers displayed on a browser of the user terminal 1510. For example, in response to a user input designating at least a portion of the plurality of customers, the user terminal 1510 selects the at least a portion of the customer. The user terminal 1510 acquires a customer image with respect to the selected at least a portion of the customers. The user terminal 1510 is a customer device or a salesclerk device. However, examples are not limited thereto.

In operation 1512, the user terminal 1510 identifies a customer. For example, the user terminal 1510 identifies the customer from the acquired customer image.

In operation 1513, the user terminal 1510 identifies a purchase tendency. For example, the user terminal 1510 determines a purchase tendency model corresponding to the customer based on the customer image.

In operation 1514, the user terminal 1510 visualizes the purchase tendency. For example, the user terminal 1510 sequentially displays the purchase tendency model corresponding to the customer on a browser 1590. In FIG. 15, the user terminal 1510 visualizes information indicating that a tendency A is 95% appropriate for the customer, a tendency B is 85% appropriate for the customer, and a tendency C is 83% appropriate for the customer.

In operation 1515, the user terminal 1510 recommends an item. For example, the user terminal 1510 determines the recommended item corresponding to a purchase tendency model of the customer from databases 1521, 1522, and 1523 stored in a service provider server 1520.

In operation 1516, the user terminal 1510 visualizes the recommended item. The user terminal 1510 displays at least one recommended item corresponding to the purchase tendency model of the customer on a browser 1590 of the user terminal 1510 sequentially based on fitting scores. For example, in FIG. 15, the user terminal 1510 visualizes information indicating that a product A fits the customer 98%, a product B fits the customer 87%, and a product C fits the customer 54%.

Figure 16:
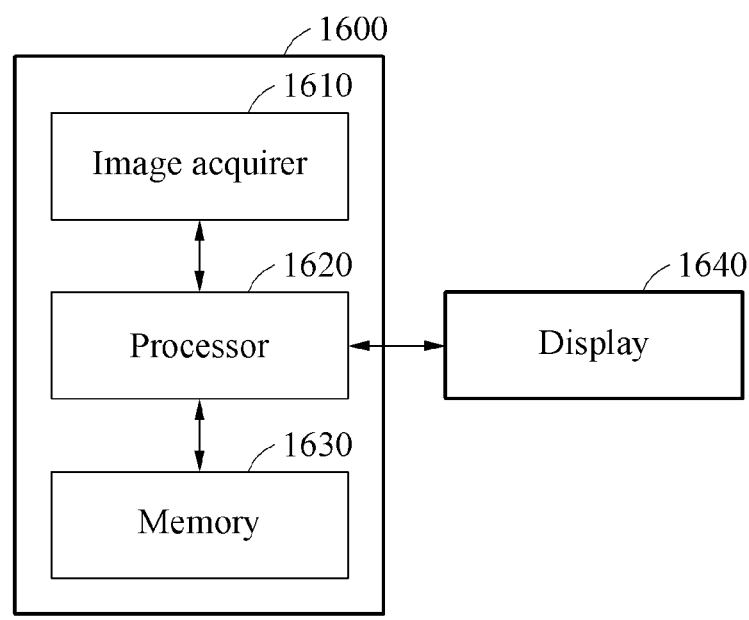
FIG. 16 illustrates an example of a configuration of a customer item recommending apparatus.

FIG. 16 illustrates an example of a configuration of a customer item recommending apparatus.

A customer item recommending apparatus 1600 includes an image acquirer 1610, a processor 1620, a memory 1630, and a display 1640.

The image acquirer 1610 acquires a customer image. For example, the image acquirer 1610 is an image sensor, for example, a camera, installed in a physical store, and continuously captures customer images corresponding to a target customer while tracking the target customer.

The processor 1620 determines a recommended item for the customer based on the acquired customer image and provides information associated with the determined recommended item. The processor 1620 performs at least a portion of the operations of the methods described with reference to FIGS. 1 through 15.

The memory 1630 temporarily or permanently stores data required for performing the customer item recommending method. For example, the memory 1630 includes a purchase tendency model, an image recognition model, a fashion item recommendation model, an image segmentation model, a style comparison model, and a category model.

The customer item recommending apparatus 1600 builds a purchase tendency model with respect to a customer cluster based on a large volume of customer purchase histories. The customer item recommending apparatus 1600 captures the target customer using a camera and analyzes a visual feature of the target customer using a deep learning technique, thereby retrieving a purchase tendency model most suitable for the target customer. The customer item recommending apparatus 1600 determines an item to be recommended to the target customer based on the retrieved purchase tendency model.

Further, the customer item recommending apparatus 1600 transmits the information associated with the recommended item to an AR device 1640 worn by the customer in the physical store. In addition, the customer item recommending apparatus 1600 assists a salesclerk as a device of the salesclerk in the physical store by providing the information related to the recommended item. Furthermore, the customer item recommending apparatus 1600 provides a recommendation to an AR device 1640 based on purchase tendency information of the customer on an image visualized on a browser of a user device.

In an example, the display 1640 is a physical structure that includes one or more hardware components that provide the ability to render an AR interface. The display 1640 may be a single-screen or a multi-screen display and may be implemented in any of the devices described above.

Thus, the customer item recommending apparatus 1600 does not require purchase data records of the customer to provide the information related to the recommended item to the customer. Further, the customer item recommending apparatus 1600 does not require the customer to input data or select a product. The customer item recommending apparatus 1600 recommends an item including a visual feature like an item corresponding to a fashion category, and further recommends an item corresponding to a non-fashion category which does not have a visual feature.

The customer item recommending apparatus 1600 provides personalized recommendation information with respect to related product and service to the customer with high quality in an AR shopping application based on a purchase tendency identified with respect to the individual customer.

The customer item recommending apparatus 1600, and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-15 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. Examples of a non-transitory computer-readable storage medium include read-only memory (ROM), random-access memory (RAM), CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of recommending a customer item, the method comprising:
    acquiring, using a camera, an image corresponding to a customer;

generating a segmented image by segmenting the acquired image using a segmentation model including one or more neural networks, where the segmented image indicates a category of one or more pixels of the image corresponding to the customer;

extracting a partial image feature vector of the customer from the segmented image;

calculating, for each of one or more purchase tendency models of a purchase tendency model database, a correlation level between the customer and the purchase tendency model based on a similarity between the partial image feature vector and a feature vector determined for the purchase tendency model;

selecting, from the purchase tendency models, a purchase tendency model having a highest correlation level among the correlation levels;

determining a recommended item for the customer based on the selected purchase tendency model; and providing, using a display, information associated with the recommended item.

2. The method of claim 1, wherein the determining comprises:
identifying a purchase tendency of the customer based on the acquired image; and
determining the recommended item for the customer based on the purchase tendency.

3. The method of claim 1, wherein the acquiring of the image comprises acquiring at least one customer image using the camera, and wherein a field of view (FOV) of the camera covers at least a portion of an area in a physical store.

4. The method of claim 1, wherein the acquiring of the image comprises acquiring the image with respect to the customer from among customers shown in a user terminal.

5. The method of claim 1,
wherein each of the purchase tendency models comprise a feature vector of an item corresponding to a fashion category, a feature vector of the acquired image, and a feature vector of an item corresponding to a non-fashion category,
wherein the calculating comprises calculating the correlation level between the customer and each of the purchase tendency models based on the feature vector of the item corresponding to the fashion category, the feature vector of the acquired image, the feature vector of the item corresponding to the non-fashion category, and the image feature of the customer.

6. The method of claim 1, further comprising:
building the purchase tendency model database by building a purchase tendency model using an online purchase database.

7. The method of claim 1, further comprising:
building the purchase tendency model database by building an offline purchase tendency model using a physical store purchase database.

8. The method of claim 1, wherein the determining of the recommended item based on the selected purchase tendency model comprises:
matching an item image of a corresponding item and the acquired image, with an item corresponding to each category in the selected purchase tendency model; and
determining the recommended item based on a fitting score calculated between the item image and the acquired image.

9. The method of claim 1, wherein the providing comprises:
transmitting a push request to a customer terminal including an augmented reality (AR) display; and
receiving information indicating whether the push request is accepted from the customer terminal.

10. The method of claim 1, wherein the providing comprises transmitting the information associated with the recommended item to a customer terminal in response to a push request being accepted by the customer terminal.

11. The method of claim 1, wherein the providing comprises transmitting item information related to the recommended item to a display disposed within a threshold distance from a position of the customer.

12. The method of claim 1, wherein the providing comprises transmitting the information associated with the recommended item to any one or any combination of a work terminal and a customer terminal.

13. The method of claim 1, wherein the determining comprises determining the recommended item based on a purchase area in which the customer is positioned and the acquired image.

14. A non-transitory computer-readable storage medium storing instructions that, when executed by a processor, cause the processor to perform the method of claim 1.

15. A processor-implemented method of recommending a customer item, the method comprising:
acquiring, using a camera, an image corresponding to a customer;
generating a segmented image by segmenting the acquired image using a segmentation model including one or more neural networks, where the segmented image indicates a category of one or more pixels of the image corresponding to the customer;
extracting an image feature of the customer from the segmented image;
retrieving a purchase tendency model corresponding to the customer from a purchase tendency model database based on the image feature;
determining a recommended item for the customer based on the purchase tendency model corresponding to the customer;
providing, using a display, information associated with the recommended item; and
building the purchase tendency model database by building the purchase tendency model using an online purchase database, wherein the building comprises:
training the purchase tendency model with statistics of online purchase records of the customer;
determining a feature vector of the customer from decomposing a purchase history matrix indicating an item purchase history of the customer;
classifying customers into a plurality of customer clusters based on the feature vector of the customer; and
determining a feature vector of an item corresponding to a category based on per-category purchase data regarding each of the plurality of customer clusters.

16. A processor-implemented method of recommending a customer item, the method comprising:
acquiring, using a camera, an image corresponding to a customer;
generating a segmented image by segmenting the acquired image using a segmentation model including one or more neural networks, where the segmented image indicates a category of one or more pixels of the image corresponding to the customer;
extracting an image feature of the customer from the segmented image;
calculating, based on the image feature, a correlation level between the customer and each of purchase tendency models of a purchase tendency model database;

selecting, from the purchase tendency models, a purchase tendency model having a highest correlation level among the correlation levels;
determining a recommended item for the customer based on the selected purchase tendency model;
providing, using a display, information associated with the recommended item; and
building the purchase tendency model database by building an offline purchase tendency model using a physical store purchase database, wherein the building comprises:
  extracting a customer identification (ID), the acquired image, and purchase records of the customer from the physical store purchase database;
  obtaining appearance information of the customer and purchase action information of the customer by analyzing the acquired image;
  classifying customers into a plurality of customer clusters based on the information obtained from the acquired image; and
  calculating a feature vector of an item corresponding to a category based on per-category purchase data regarding each of the plurality of customer clusters.

17. A processor-implemented method of recommending a customer item, the method comprising:
  acquiring, using a camera, an image corresponding to a customer;
  generating a segmented image by segmenting the acquired image using a segmentation model including one or more neural networks, where the segmented image indicates a category of one or more pixels of the image corresponding to the customer;
  extracting an image feature of the customer from the segmented image;
  calculating, based on the image feature, a correlation level between the customer and each of purchase tendency models of a purchase tendency model database;
  selecting, from the purchase tendency models, a purchase tendency model having a highest correlation level among the correlation levels;
  determining a recommended item for the customer based on the selected purchase tendency model; and
  providing, using a display, information associated with the recommended item,
  wherein the determining of the recommended item based on the selected purchase tendency model comprises:
    matching an item image of a corresponding item and the acquired image, with an item corresponding to each category in the selected purchase tendency model; and
    determining the recommended item based on a fitting score calculated between the item image and the acquired image, and
  wherein the fitting score is based on calculating an inner product between a feature vector of an individual item in the selected purchase tendency model and a feature vector of an item worn by the customer.

18. An apparatus for recommending a customer item, the apparatus comprising:
  a camera configured to acquire an image corresponding to a customer;
  a processor configured to:
    generate a segmented image by segmenting the acquired image using a segmentation model including one or more neural networks, where the segmented image indicates a category of one or more pixels of the image corresponding to the customer;
    extract a partial image feature vector of the customer from the segmented image;
    calculate, for each of one or more purchase tendency models of a purchase tendency model database, a correlation level between the customer and the purchase tendency model based on a similarity between the partial image feature vector and a feature vector determined for the purchase tendency model;
    select, from the purchase tendency models, a purchase tendency model having a highest correlation level among the correlation levels; and
    determine a recommended item for the customer based on the selected purchase tendency model; and a display configured to provide information associated with the determined recommended item.

* * * * *